United States Patent
Itou

(10) Patent No.: US 11,196,536 B2
(45) Date of Patent: Dec. 7, 2021

(54) RECEIVING APPARATUS, RECEIVING METHOD, COMPUTER READABLE MEDIUM STORING RECEIVING PROGRAM, AND MANUFACTURING METHOD

(71) Applicant: FUJI ELECTRIC CO., LTD., Kanagawa (JP)

(72) Inventor: Keiichi Itou, Matsumoto (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 0 days.

(21) Appl. No.: 16/455,790

(22) Filed: Jun. 28, 2019

(65) Prior Publication Data
US 2020/0052874 A1     Feb. 13, 2020

(30) Foreign Application Priority Data
Aug. 8, 2018   (JP) .............................. JP2018-149525

(51) Int. Cl.
| | | |
|---|---|---|
| *H04L 7/00* | (2006.01) | |
| *H04L 1/00* | (2006.01) | |
| *H04L 7/04* | (2006.01) | |

(52) U.S. Cl.
CPC .......... *H04L 7/0087* (2013.01); *H04L 1/0061* (2013.01); *H04L 7/0091* (2013.01); *H04L 7/042* (2013.01)

(58) Field of Classification Search
None
See application file for complete search history.

(56) References Cited

U.S. PATENT DOCUMENTS

| | | | | | |
|---|---|---|---|---|---|
| 4,535,353 | A | * | 8/1985 | Turner | .................... H04N 5/08 348/525 |
| 4,581,641 | A | * | 4/1986 | Turner | .................. H04N 5/213 348/607 |
| 5,161,187 | A | * | 11/1992 | Kajita | .................. H04N 7/1675 348/E7.056 |
| 9,509,445 | B2 | * | 11/2016 | Hammerschmidt | .. F02D 41/222 |
| 9,753,830 | B2 | * | 9/2017 | Bowling | ............... H04L 7/0091 |
| 10,951,327 | B2 | * | 3/2021 | Itou | .......................... H04L 5/04 |
| 2011/0176589 | A1 | * | 7/2011 | Kolof | ..................... H04L 7/044 375/224 |

(Continued)

FOREIGN PATENT DOCUMENTS

JP          2015046770 A       3/2015

*Primary Examiner* — Christopher T Wyllie

(57) ABSTRACT

A receiving apparatus is provided, including: a receiving unit to receive a plurality of pulses including a synchronization pulse and a data pulse having a data pulse width corresponding to a data value; a searching unit to search for pulse information indicating a pulse period or the like that falls within a synchronization pulse acceptable range from among pulse information indicating pulse periods or pulse widths of the respective pulses; a detecting unit to detect whether pulse information of a second pulse at a predetermined location relative to a first pulse corresponding to the searched pulse information indicates a pulse period or the like that falls within a data pulse acceptable range; an identifying unit to identify the first pulse as the synchronization pulse on condition that the pulse information of the second pulse indicates a pulse period or the like that falls within the data pulse acceptable range.

9 Claims, 16 Drawing Sheets

(56) References Cited

U.S. PATENT DOCUMENTS

| | | | |
|---|---|---|---|
| 2012/0158335 A1* | 6/2012 | Donovan | G05B 19/0423 702/79 |
| 2012/0195400 A1* | 8/2012 | Tomar | H04L 7/044 375/354 |
| 2013/0345924 A1* | 12/2013 | Tomar | G01P 15/125 701/30.5 |
| 2014/0254731 A1* | 9/2014 | Bowling | H04L 7/0331 375/355 |
| 2015/0066301 A1* | 3/2015 | Kozawa | B62D 5/0463 701/41 |
| 2015/0236746 A1* | 8/2015 | Scheinkerman | H04L 67/12 375/219 |
| 2015/0236876 A1* | 8/2015 | Cadugan | H04L 67/12 375/242 |
| 2015/0269019 A1* | 9/2015 | Scherr | H04L 1/0061 714/807 |
| 2015/0270994 A1* | 9/2015 | Scherr | H04L 25/4902 375/238 |
| 2016/0020797 A1* | 1/2016 | Hammerschmidt | H04L 25/4902 375/316 |
| 2016/0124798 A1* | 5/2016 | Shevelenok | G06F 13/4295 714/57 |
| 2016/0294534 A1* | 10/2016 | Kozawa | H04L 5/00 |
| 2016/0360500 A1* | 12/2016 | Kim | H04B 7/04 |
| 2017/0250961 A1* | 8/2017 | Rasbornig | H04L 9/0819 |
| 2018/0172484 A1* | 6/2018 | Hammerschmidt | G01D 9/00 |
| 2019/0372680 A1* | 12/2019 | Itou | G06F 11/1004 |
| 2020/0052874 A1* | 2/2020 | Itou | H04L 1/0061 |

\* cited by examiner

| TICK | 12 | 13 | 14 | 15 | 16 | 17 | 18 | 19 | 20 | 21 | 22 | 23 | 24 | 25 | 26 | 27 |
|------|----|----|----|----|----|----|----|----|----|----|----|----|----|----|----|----|
| DATA | 0 | 1 | 2 | 3 | 4 | 5 | 6 | 7 | 8 | 9 | 0xA | 0xB | 0xC | 0xD | 0xE | 0xF |

*FIG. 3*

| NIBBLE NUMBER | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| SERIAL DATA BIT 3 | 1 | 0 | 0 | 0 | 0 | 0 | 0 | 0 | 0 | 0 | 0 | 0 | 0 | 0 | 0 | 0 |
| SERIAL DATA BIT 2 | MID | | | | DATA | | | | | | | | CRC | | | |

*FIG. 4*

| NIBBLE NUMBER | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| SERIAL DATA BIT 3 | 1 | 1 | 1 | 1 | 1 | 1 | 0 | 0 | | | MID | | 0 | | | MID | | 0 |
| SERIAL DATA BIT 2 | | CRC | | | | | | | | | | | DATA | | | | | |

FIG. 5

| NIBBLE NUMBER | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| SERIAL DATA BIT 3 | 1 | 1 | 1 | 1 | 1 | 1 | 0 | 1 | | | | | | | | | | 0 |
| SERIAL DATA BIT 2 | | CRC | | | | | | | | MID | | | 0 | | DATA | | | 0 |
| | | | | | | | | | | | | DATA | | | | | | |

FIG. 6

| ENTRY NUMBER | PULSE INFORMATION | SYNCHRONIZATION PULSE FLAG |
| --- | --- | --- |
| 0 | 86 | 0 |
| 1 | 56 | 1 |
| 2 | 12 | 0 |
| 3 | 27 | 0 |
| 4 | 17 | 0 |
| 5 | 22 | 0 |
| 6 | 14 | 0 |
| 7 | 20 | 0 |
| 8 | 12 | 0 |
| 9 | 21 | 0 |
| 10 | 77 | 0 |
| 11 | 57 | 1 |
| 12 | 19 | 0 |
| ⋮ | ⋮ | ⋮ |

*FIG. 11*

| ADDRESS | CATEGORY | CONTENT |
|---|---|---|
| 0×000 | ADJUSTMENT INFORMATION | OSCILLATOR ADJUSTMENT DATA |
| 0×005 | | ADC ADJUSTMENT DATA |
| ⋮ | | ⋮ |
| 0×010 | CORRECTION INFORMATION | TEMPERATURE CORRECTION DATA |
| 0×020 | | PRESSURE CORRECTION DATA |
| ⋮ | | ⋮ |
| 0×040 | CONFIGURATION INFORMATION | COMMUNICATION CONFIGURATION DATA |
| ⋮ | | ⋮ |
| 0×060 | MANUFACTURE INFORMATION | MANUFACTURE-SPECIFIC DATA |
| ⋮ | | ⋮ |

*FIG. 14*

RECEIVING APPARATUS, RECEIVING METHOD, COMPUTER READABLE MEDIUM STORING RECEIVING PROGRAM, AND MANUFACTURING METHOD

The contents of the following Japanese patent application(s) are incorporated herein by reference:
No. 2018-149525 filed in JP on Aug. 8, 2018.

BACKGROUND

1. Technical Field

The present invention relates to a receiving apparatus, a receiving method, a receiving program, and a manufacturing method.

2. Related Art

Conventionally, communication schemes have been known that use the pulse widths of a plurality of pulses included in a message to identify the starting location of the message or represent the data value. An example of such communication schemes is SENT (registered trademark) communication. In such communication schemes, a transmitting apparatus incorporates pulses for error detection/correction such as parities or CRCs into a message so that errors in data values indicated by one or more data pulses can be detected or corrected (see Patent Document 1).

Patent Document 1: Japanese Patent Application Publication No. 2015-46770

In the above-described communication schemes, a receiving apparatus determines that a pulse that falls within an acceptable error range (e.g., ±20%) relative to a predetermined pulse width is a synchronization pulse indicating the starting location of a message, and receives data pulses with reference to the synchronization pulse. However, to improve communication reliability, it is desired to detect the synchronization pulse with higher accuracy.

SUMMARY

To solve the above-described issue, a first aspect of the present invention provides a receiving apparatus including: a receiving unit configured to receive a plurality of pulses including a synchronization pulse having a predetermined synchronization pulse width and a data pulse having a data pulse width corresponding to a value of data; a pulse information storing unit configured to store, in a buffer, pulse information indicating a pulse period or pulse width of each of the plurality of pulses; a searching unit configured to search for pulse information indicating a pulse period or pulse width that falls within a synchronization pulse acceptable range from among a plurality of pieces of pulse information stored in the buffer for the plurality of pulses; a detecting unit configured to detect whether pulse information stored in the buffer for a second pulse at a predetermined location relative to a first pulse corresponding to the pulse information searched for by the searching unit indicates a pulse period or pulse width that falls within a data pulse acceptable range; and an identifying unit configured to identify the first pulse as the synchronization pulse on condition that the pulse information of the second pulse indicates a pulse period or pulse width that falls within the data pulse acceptable range.

A second aspect of the present invention provides a receiving method including: receiving a plurality of pulses including a data pulse having a data pulse width; the computer storing, in a buffer, pulse information indicating a pulse period or pulse width of each of the plurality of pulses; the computer searching for pulse information indicating a pulse period or pulse width that falls within a synchronization pulse acceptable range from among a plurality of pieces of pulse information stored in the buffer for the plurality of pulses; the computer detecting whether pulse information stored in the buffer for a second pulse at a predetermined location relative to a first pulse corresponding to the pulse information searched for indicates a pulse period or pulse width that falls within a data pulse acceptable range; and the computer identifying the first pulse as the synchronization pulse on condition that the pulse information of the second pulse indicates a pulse period or pulse width that falls within the data pulse acceptable range.

A third aspect of the present invention provides a computer-readable recording medium having recorded thereon a receiving program that, when executed by a computer, causes the computer to function as: a receiving unit configured to receive a plurality of pulses including a synchronization pulse having a predetermined synchronization pulse width and a data pulse having a data pulse width corresponding to a value of data; a pulse storing unit configured to store, in a buffer, pulse information indicating a pulse period or pulse width of each of the plurality of pulses; a searching unit configured to search for pulse information indicating a pulse period or pulse width that falls within a synchronization pulse acceptable range from among a plurality of pieces of pulse information stored in the buffer for the plurality of pulses; a detecting unit configured to detect whether pulse information stored in the buffer for a second pulse at a predetermined location relative to a first pulse corresponding to the pulse information searched for by the searching unit indicates a pulse period or pulse width that falls within a data pulse acceptable range; and an identifying unit configured to identify the first pulse as the synchronization pulse on condition that the pulse information of the second pulse indicates a pulse period or pulse width that falls within the data pulse acceptable range.

A fourth aspect of the present invention provides a receiving apparatus including: a receiving unit configured to receive a message including a synchronization pulse having a predetermined synchronization pulse width, a first data pulse having a data pulse width corresponding to a value of first data, and a second data pulse having a data pulse width corresponding to a value of partial data in which second data is encoded in a divided manner; a pulse information storing unit configured to store, in the buffer, pulse information indicating a pulse period or pulse width for each pulse included in the message; an extracting unit configured to detect, based on the pulse information of each message stored in the buffer, a starting message of a message group including a plurality of messages in which the second data is encoded in a divided manner, to extract pulses of the plurality of messages included in the message group; and a data output unit configured to output the first data and the second data corresponding to the pulse information stored in the buffer for each pulse included in the plurality of messages.

A fifth aspect of the present invention provides a manufacturing method including: manufacturing a device including a batch-erasable non-volatile memory; writing first information in the non-volatile memory before shipping of the device; acquiring second information to be written in the non-volatile memory before shipping of the device; writing the first information and the second information in the non-volatile memory after first performing batch erasure of the non-volatile memory in which the first information is written.

The summary clause does not necessarily describe all necessary features of the embodiments of the present invention. The present invention may also be a sub-combination of the features described above.

BRIEF DESCRIPTION OF THE DRAWINGS

FIG. 3 shows the correspondence between pulse widths and data values of data pulses in a message according to the present embodiment.

FIG. 4 shows a first example of data transported by status pulses of messages according to the present embodiment.

FIG. 5 shows a second example of data transported by status pulses of messages according to the present embodiment.

FIG. 6 shows a third example of data transported by status pulses of messages according to the present embodiment.

FIG. 11 shows an example of contents stored in a buffer 715 according to the present embodiment.

FIG. 14 shows an example of information stored in a non-volatile memory 1330 according to the present embodiment.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
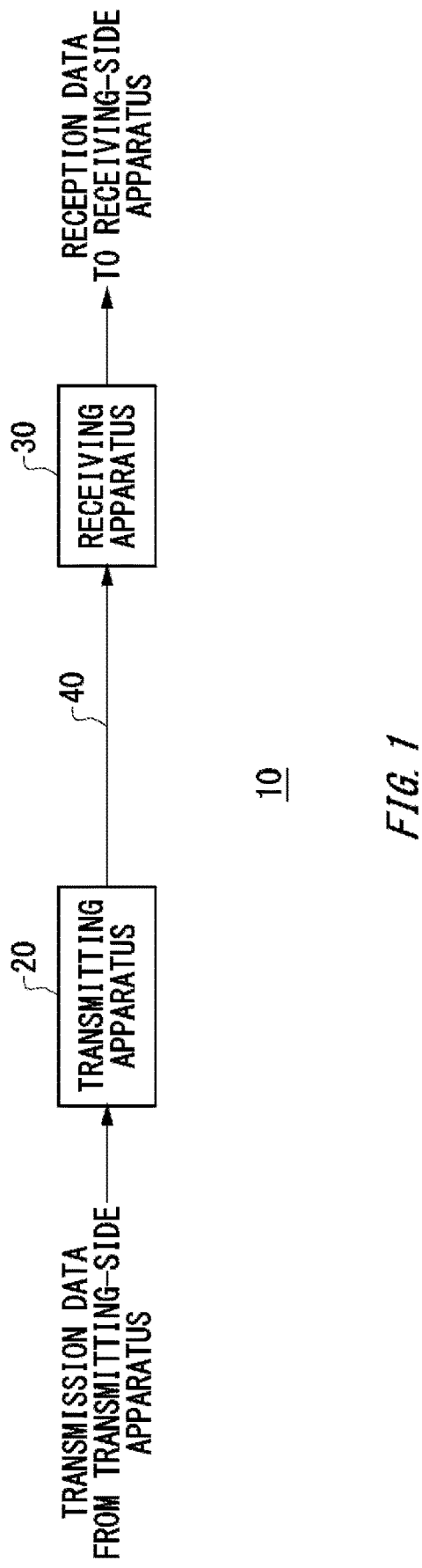
FIG. 1 shows the configuration of a communication system 10 according to the present embodiment.

FIG. 1 shows the configuration of a communication system 10 according to the present embodiment. The communication system 10 includes a transmitting apparatus 20, a receiving apparatus 30, and a communication channel 40.

The transmitting apparatus 20 is connected to the receiving apparatus 30 via the communication channel 40, and transmits, to the receiving apparatus 30, a message including transmission data received from a transmitting-side apparatus. As an example, the transmitting apparatus 20 according to the present embodiment is connected to an apparatus including a sensor such as a pressure sensor, and transmits, to the receiving apparatus 30, a message including sensor data acquired from the sensor.

The receiving apparatus 30 is connected to the transmitting apparatus 20 via the communication channel 40, and receives the message from the transmitting apparatus 20 to supply reception data to a receiving-side apparatus. As an example, the receiving apparatus 30 according to the present embodiment supplies the receiving-side apparatus with sense data included in the message received from the transmitting apparatus 20. In response, the receiving-side apparatus controls an apparatus such as a vehicle or an engine in which the communication system 10 is provided, based on the sensor data.

The communication channel 40 connects the transmitting apparatus 20 and the receiving apparatus 30 to each other. As an example, the communication channel 40 is a communication channel for on-vehicle networks, and may be a connection using serial signal lines.

Note that the communication system 10 may be utilized as various communication interfaces other than the above-described usage. Also, the receiving apparatus 30 may not be a receiving apparatus used in actual application of the communication system 10, but may be a receiving apparatus included in a testing apparatus or diagnostic apparatus used for testing or diagnosing the transmitting apparatus 20 or the communication channel 40, for example.

Figure 2:
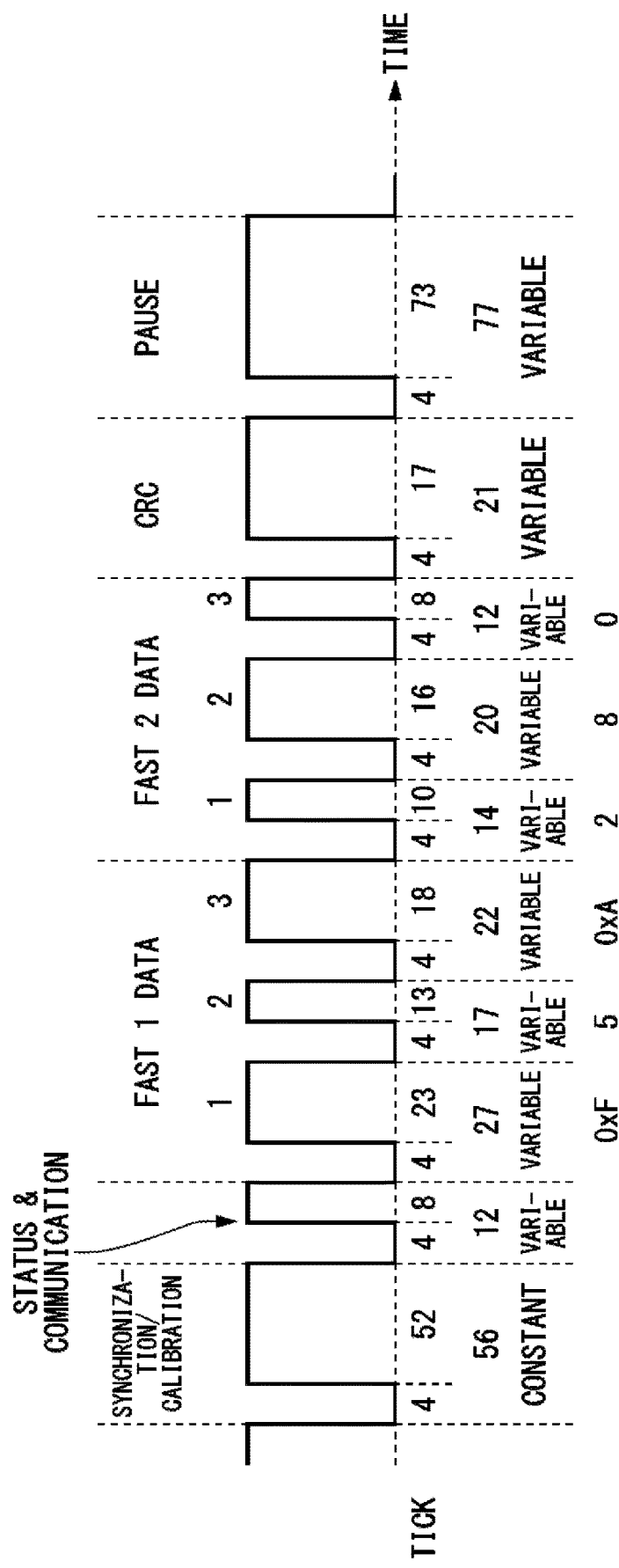
FIG. 2 shows an example of a message according to the present embodiment.

FIG. 2 shows an example of a message according to the present embodiment. In the present example, the message is transported by a serial signal that takes two values of logical HIGH (logical H) and logical LOW (logical L). Logical H may have a voltage greater than or equal to a predetermined threshold voltage, and logical L may have a voltage less than the threshold voltage. The message includes a plurality of pulses. Each pulse rises from logical L to logical H, and falls to logical L after a time length predetermined for the pulse. The width of a time period for which a pulse is at logical H is referred to a pulse width.

The present embodiment will be described using an example in which the SENT (Single-Edge Nibble Transmission) protocol is used as the communication scheme. In the SENT protocol, a message includes a Synchronization/Calibration pulse, a Status & Communication pulse, a plurality of (three) fast 1 data pulses, a plurality of (three) fast 2 data pulses, a CRC pulse, and a pause pulse.

The synchronization/calibration pulse has a predetermined pulse width (indicated as a "synchronization pulse width"). In the SENT protocol, the synchronization/calibration pulse is a pulse that has a constant pulse width and takes logical H for a pulse width of 52 unit time periods (also indicated as "ticks"). In the SENT protocol, pulse widths are defined using units of ticks. A tick is a time length predetermined between the transmitting apparatus 20 and the receiving apparatus 30 (e.g., 3 us). The synchronization/calibration pulse is an example of a synchronization pulse, and indicates the starting location of a message.

The status & communication pulse (also indicated as a "status pulse") is a pulse next to the synchronization/calibration pulse, and has a variable pulse width and takes logical H for a pulse width (also indicated as a "data pulse width") corresponding to a data value such as a status. The status pulse transports data such as a status, and is also indicated as a "second data pulse". The status pulse transports 4-bit (1-nibble) data indicating a status or the like.

The fast 1 data pulses are three pulses next to the status pulse, and have variable pulse widths (data pulse widths) corresponding to values of fast 1 data. The fast 2 data pulses are three pulses next to the fast 1 data pulses, and have variable pulse widths (data pulse widths) corresponding to values of fast 2 data. These data pulses are examples of a "first data pulse". These data pulses each transport 4-bit data (data as an example of "first data").

The CRC pulse is a pulse next to the fast 2 data pulses, and has a variable pulse width corresponding to a value of an error detection/correction code. The CRC pulse transports a 4-bit error detection/correction code.

The pause pulse is a pulse arranged between successive messages, and has a pulse width that fills between the end of the CRC pulse of the previous message and before the synchronization/calibration pulse of the next message. The pulse width of the pause pulse is set to be greater than the pulse width of the synchronization/calibration pulse, at minimum. Note that, in the SENT protocol, the pause pulse is optional, and if the pause pulse is not used, a signal of logical L is provided between the CRC pulse and the synchronization/calibration pulse.

In the SENT protocol, a time period at logical L for 4 ticks is provided in each interval between the above-described pulses.

FIG. 3 shows the correspondence between pulse widths and data values of data pulses in a message according to the present embodiment. Note that this figure also applies to the status pulse and CRC pulse transporting status data and data as an error detection/correction code.

In the SENT protocol, as shown in this figure, a pulse indicating data value 0 has a pulse width of 12 ticks, a pulse indicating data value 1 has a pulse width of 13 ticks, and so forth, and a pulse indicating data value 15 (0xF) has a pulse width of 27 ticks.

FIG. 4 shows a first example of data transported by status pulses of messages according to the present embodiment. The SENT protocol prescribes data transport that encodes data by dividing it into status pulses of a plurality of messages (data transport using the Slow channel), in addition to data transport using fast 1 data and fast 2 data. Two types of formats, the Short format and the Enhanced format, are prescribed for the data transport using the Slow channel. This figure shows the Short format among them.

In the Short format, the transmitting apparatus 20 encodes data by dividing it into status pulses included in respective messages of a message group including 16 successive messages. In this figure, a nibble number indicates the number of a status pulse in the Short format, and is the same as the number of the message in the message group. While each status pulse has 4-bit (1-nibble) data, two bits (serial data bits 3 and 2) of it are used in the Short format.

In the Short format, serial data bit 3 includes a bit sequence of "1000000000000000" in nibbles 1 to 16. Serial data bit 2 includes a message ID ("MID" in the figure) in nibbles 1 to 4, data in nibbles 5 to 12, and a CRC in nibbles 13 to 16. The data encoded in serial data bits 3 and 2 in the Short format is an example of "second data".

The message ID is a 4-bit message identification number for data transported on the Slow channel. The data is 8-bit data transported on the Slow channel. The CRC is a CRC for the data transported on the Slow channel, and may be a CRC of the message ID and a data portion.

FIG. 5 shows a second example of data transported by status pulses of messages according to the present embodiment. This figure shows a case in which the configuration bit is set to 0 in the Enhanced format.

In the Enhanced format, the transmitting apparatus 20 encodes data by dividing it into status pulses included in respective messages of a message group including 18 successive messages. In this figure, a nibble number indicates the number of a status pulse in the Enhanced format, and is the same as the number of the message in the message group. The Enhanced format also uses two bits (serial data bits 3 and 2) of each status pulse (1 nibble).

In the Enhanced format, if the configuration bit is set to 0, serial data bit 3 includes "111111" in nibbles 1 to 6, "0" in nibble 7, the configuration bit "0" in nibble 8, (part of) the message ID in nibbles 9 to 12, "0" in nibble 13, (part of) the message ID in nibbles 14 to 17, and "0" in nibble 18. Serial data bit 2 includes a CRC in nibbles 1 to 6, and data in nibbles 7 to 18. The data encoded in serial data bits 3 and 2 in the Enhanced format is an example of the "second data".

The message ID is a 8-bit message identification number for data transported on the Slow channel. The data is 12-bit data transported on the Slow channel. The CRC is a CRC for the data transported on the Slow channel, and may be a CRC of the message ID and a data portion.

FIG. 6 shows a third example of data transported by status pulses of messages according to the present embodiment. This figure shows a case in which the configuration bit is set to 1 in the Enhanced format.

In the Enhanced format, if the configuration bit is set to 1, serial data bit 3 includes "111111" in nibbles 1 to 6, "0" in nibble 7, the configuration bit "1" in nibble 8, the message ID in nibbles 9 to 12, "0" in nibble 13, (part of) data in nibbles 14 to 17, and "0" in nibble 18. Serial data bit 2 includes a CRC in nibbles 1 to 6, and (part of) data in nibbles 7 to 18.

The message ID is a 4-bit message identification number for data transported on the Slow channel. The data is 16-bit data transported on the Slow channel. The CRC is a CRC for the data transported on the Slow channel, and may be a CRC of the message ID and a data portion.

The receiving apparatus 30 can discriminate between the Short format and the Enhanced format based on whether there are six successive messages whose serial data bit 3 is "1". In the case of the Short format, the receiving apparatus 30 can determine that a message whose serial data bit 3 is "1" is the start of the message group. In the case of the Enhanced format, the receiving apparatus 30 can determine that a message including the starting "1" of six successive "1"s in serial data bit 3 is the start of the message group.

Figure 7:
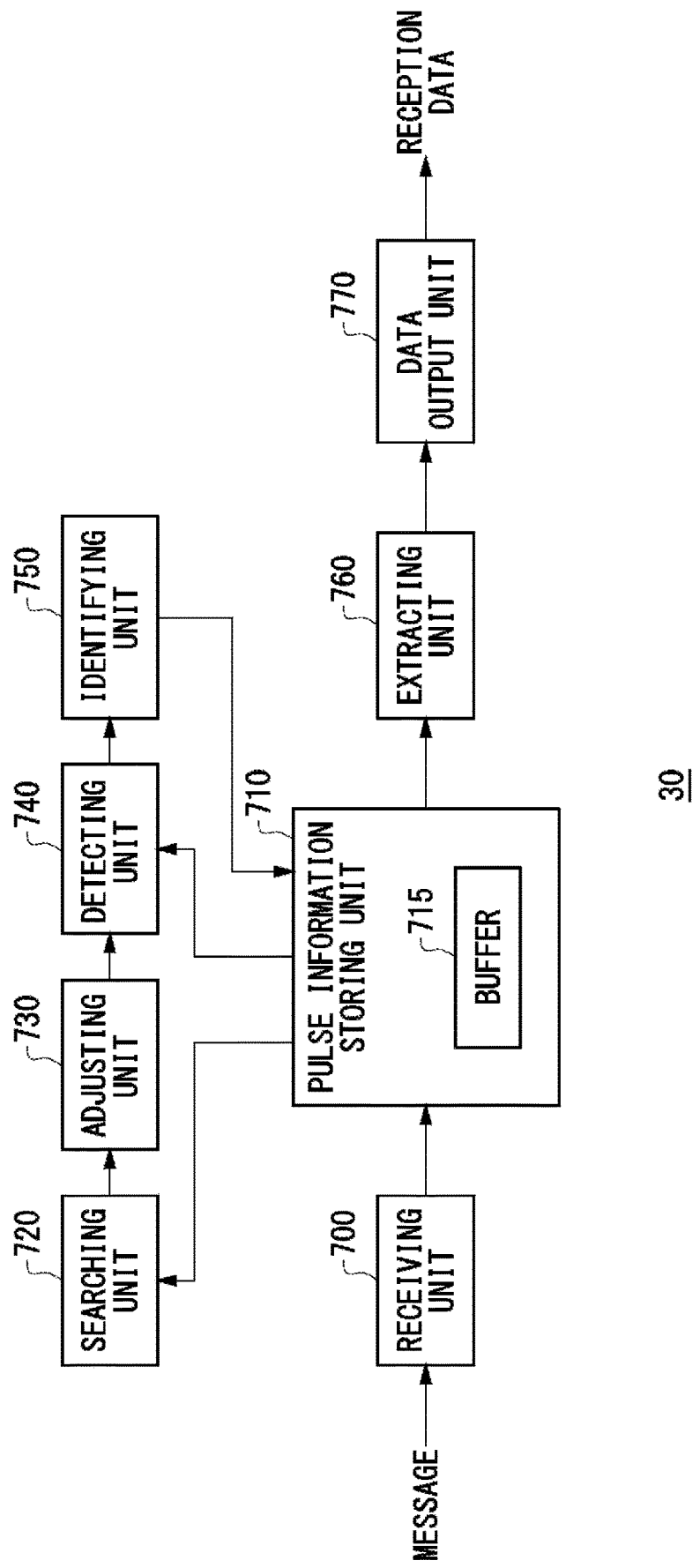
FIG. 7 shows the configuration of a receiving apparatus 30 according to the present embodiment.

FIG. 7 shows the configuration of the receiving apparatus 30 according to the present embodiment. The receiving apparatus 30 includes a receiving unit 700, a pulse information storing unit 710, a searching unit 720, an adjusting unit 730, a detecting unit 740, an identifying unit 750, an extracting unit 760, and a data output unit 770.

The receiving unit 700 receives, via the communication channel 40, a plurality of pulses included in one or more messages transmitted by the transmitting apparatus 20. As an example, the receiving unit 700 determines the logical value (logical H or logical L) of a signal received from the communication channel 40 by comparing the signal with a threshold voltage. The receiving unit 700 then identifies a plurality of pulses from a received signal sequence using determination results, and calculates pulse information indicating the pulse period or pulse width of each pulse.

In the present embodiment, the receiving unit 700 observes the determined logical values of the signals, and detects the pulse period or pulse width of each pulse. The receiving unit 700 may be implemented by dedicated circuitry, or may alternatively be implemented by program execution in a microcontroller or the like. By measuring the time interval between two time points at which a signal changes from logical L to logical H, the receiving unit 700 can measure the pulse interval (a time width obtained by adding the interval between pulses to the pulse width of the pulse located between these time points), i.e., the pulse period. Alternatively, the receiving unit 700 can measure the pulse width by measuring the time interval between a time point at which a signal changes from logical L to logical H and a time point at which the signal changes from logical H to logical L.

If there is a one-to-one relationship between the pulse width and the pulse period, such as in the case in which a fixed-length (e.g., 4-tick) interval is provided between pulses as shown in FIG. 2, the receiving apparatus 30 can correctly interpret the content of received messages by using either of the pulse period or pulse width. Thus, as used herein, the term "pulse information" represents information indicating a pulse period or pulse width. The pulse information may directly indicate the very value of the pulse period or pulse width, or may alternatively indirectly indicate the value of the pulse period or pulse width by indicating what is converted from the value of the pulse period or pulse width under any rule.

The pulse information storing unit 710 is connected to the receiving unit 700. The pulse information storing unit 710 includes a buffer 715, and stores, in the buffer 715, pulse information indicating the pulse period or pulse width of each of a plurality of received pulses. The buffer 715 may be a FIFO (First-In First-Out) buffer that sequentially stores the respective pulse information of the plurality of received pulses in the order of reception. The buffer 715 may also be implemented on a memory of a computer that functions as the receiving apparatus 30.

The searching unit 720 is connected to the pulse information storing unit 710, and searches for pulse information indicating a pulse period or pulse width that falls within a synchronization pulse acceptable range from among a plurality of pieces of pulse information stored in the buffer 715 for the plurality of received pulses. The searching unit 720 searches the pieces of pulse information in the buffer 715 in the order of reception, and finds pulse information that falls within the synchronization pulse acceptable range in the order of reception. The pulse corresponding to the pulse information found by the searching unit 720 (indicated as a "first pulse") is a candidate for the synchronization pulse.

The adjusting unit 730 is connected to the searching unit 720, and adjusts a data pulse acceptable range based on the pulse period or pulse width indicated by the pulse information for the first pulse and on a reference period or reference width of the synchronization pulse. Thus, if a first pulse having a pulse width of 182 us is detected despite the fact that the 1-tick time length is prescribed as 3 us between the transmitting apparatus 20 and the receiving apparatus 30, for example, the adjusting unit 730 regards the 1-tick time length as 3.5 us (=182/52), and adjusts the data pulse acceptable range to 42 us (3.5 us×12) to 94.5 us (3.5 us×27)±20%. In this manner, even if there is an error in 1-tick time length in pulses transmitted by the transmitting apparatus 20, the receiving apparatus 30 can adjust the 1-tick time length based on the pulse period or pulse width of the first pulse to be a candidate for the synchronization pulse, to correctly determine the pulse period or pulse width of subsequent data pulses or the like.

The detecting unit 740 is connected to the pulse information storing unit 710 and the adjusting unit 730, and detects whether pulse information stored in the buffer 715 for a second pulse at a predetermined location relative to the first pulse corresponding to the pulse information searched for by the searching unit 720 indicates a pulse period or pulse width that falls within the data pulse acceptable range. In the present embodiment, the detecting unit 740 receives the location of the pulse information of the first pulse in the buffer 715 from the searching unit 720 via the adjusting unit 730. The detecting unit 740 also receives the data pulse acceptable range adjusted by the adjusting unit 730 or the adjusted 1-tick time length from the adjusting unit 730. The detecting unit 740 regards a second pulse at a predetermined relative location from the first pulse (e.g., a pulse next to the first pulse) in the buffer 715 as a candidate for data pulse. The detecting unit 740 requests the pulse information storing unit 710 for a read of the pulse information of the second pulse in the buffer 715, to acquire the pulse information of the second pulse. The detecting unit 740 then detects whether the pulse information of the second pulse read from the buffer 715 indicates a pulse period or pulse width that falls within the data pulse acceptable range.

The identifying unit 750 is connected to the detecting unit 740, and identifies the first pulse as the synchronization pulse on condition that the pulse information of the second pulse indicates a pulse period or pulse width that falls within the data pulse acceptable range. The identifying unit 750 receives, from the detecting unit 740, the detection result of the detecting unit 740 and the location of the pulse information of the first pulse in the buffer 715. The identifying unit 750 determines the first pulse as the synchronization pulse in response to receiving a detection result that the pulse information of the second pulse indicates a pulse period or pulse width that falls within the data pulse acceptable range. In this case, the identifying unit 750 instructs the pulse information storing unit 710 to store, in the buffer 715, information indicating that the first pulse is the synchronization pulse in correspondence with the pulse information of the first pulse.

The extracting unit 760 is connected to the pulse information storing unit 710, and extracts, as pulses included in the message, a number of pulses (pulses from the synchronization pulse to the CRC pulse in the example of FIG. 2) predetermined with reference to the first pulse determined as the synchronization pulse. The extracting unit 760 then reads, from the buffer 715 via the pulse information storing unit 710, the pulse information stored in the buffer 715 for each pulse included in the message, and supplies it to the data output unit 770.

The data output unit 770 is connected to the extracting unit 760, and outputs, to the receiving-side apparatus, reception data corresponding to the pulse information stored in the buffer for each pulse included in the message.

According to the receiving apparatus 30 as described above, rather than unconditionally determining that a pulse having a pulse period or pulse width that falls within the synchronization pulse acceptable range is the synchronization pulse, the determination is made by additionally considering the condition that a pulse at a predetermined location relative to the synchronization pulse (a location corresponding to at least one of the status pulse, data pulses, and CRC pulse in the same message as that of the synchronization pulse) has a pulse period or pulse width that falls within the data pulse acceptable range. In this manner, the receiving apparatus 30 can detect the synchronization pulse with higher accuracy.

Figure 8:
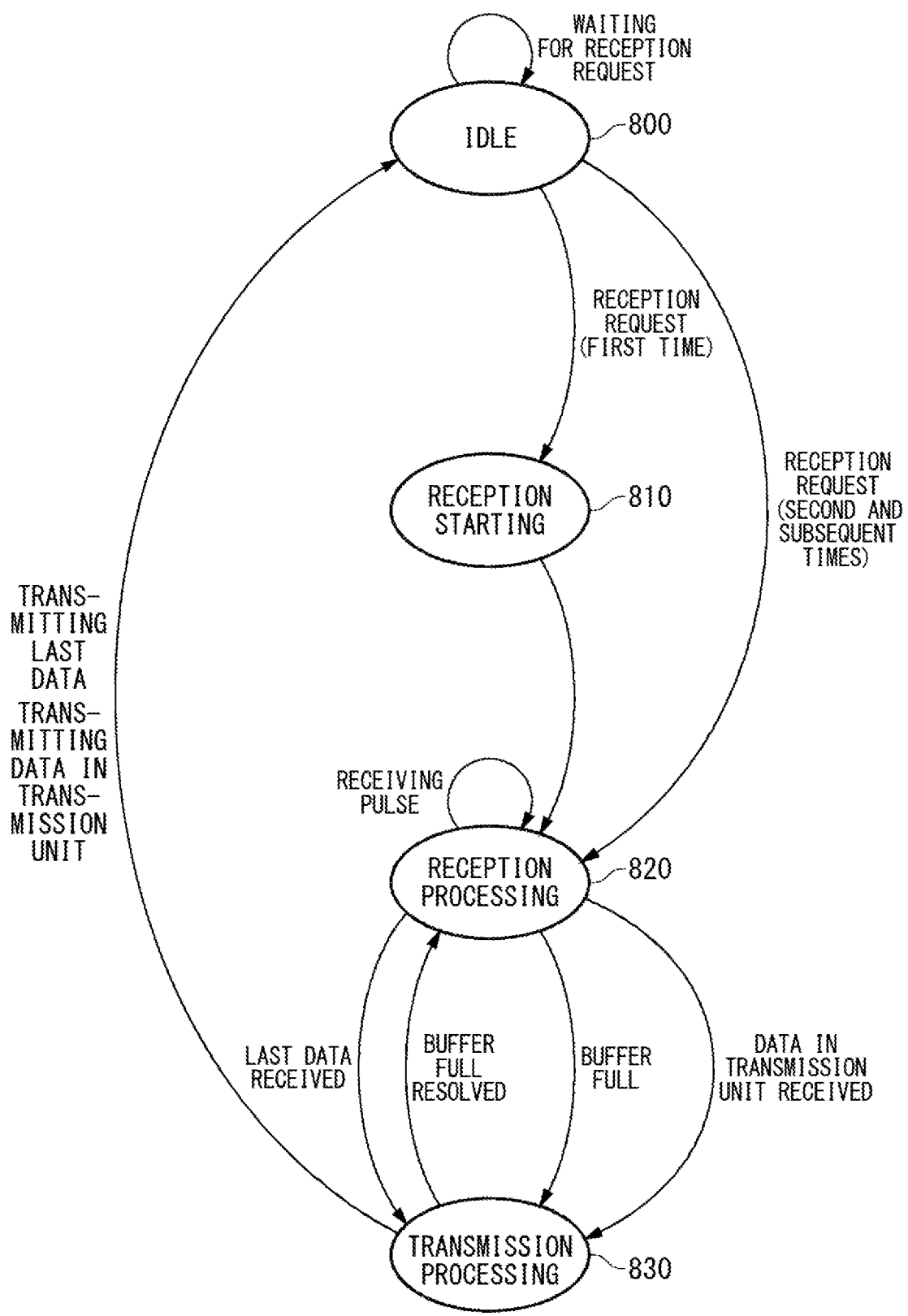
FIG. 8 shows state transitions of the operation of the receiving apparatus 30 according to the present embodiment.

FIG. 8 shows state transitions of the operation of the receiving apparatus 30 according to the present embodiment. The receiving apparatus 30 performs a reception process while its operational state transitions between an idle state 800, a reception starting state 810, a reception processing state 820, and a transmission processing state 830.

(1) Idle State 800

The receiving apparatus 30 enters the idle state 800 when completing initialization after start-up. Also, the receiving apparatus 30 transitions to the idle state 800 when data in a transmission unit included in one or more received messages is transmitted to the receiving-side apparatus and the buffer 715 is freed. For the receiving apparatus 30 according to the present embodiment, the transmission unit for messages in the Short format as shown in FIG. 4 uses 16 messages, corresponding to one period of the Slow channel, and the transmission unit for message groups in the Enhanced format as shown in FIGS. 5 and 6 uses 18 messages of data, corresponding to one period of the Slow channel. The receiving apparatus 30 may also handle the Enhanced format including even more messages such as 256 messages, for example. Note that, if the message does not include the Slow channel, the receiving apparatus 30 may use a transmission unit corresponding to one message.

In the idle state 800, the receiving apparatus 30 waits for a reception request from the receiving-side apparatus. When accepting a reception request for the first time after start-up, the receiving apparatus 30 transitions to the reception starting state 810. When accepting a reception request for the second and subsequent times after start-up, the receiving apparatus 30 transitions to the reception processing state 820.

(2) Reception Starting State 810

In the reception starting state 810, the receiving apparatus 30 performs a starting process of the reception of a message. For example, the receiving apparatus 30 initializes various buffer pointers that point to entries in the buffer 715. Examples of such buffer pointers include a store pointer indicating an entry storing a pulse that the receiving unit 700 receives next, an output pointer indicating an entry storing a pulse that the extracting unit 760 extracts next, a load pointer indicating an entry from which the searching unit 720 should start the next search, and the like.

Also, in the reception starting state 810, the receiving apparatus 30 starts the reception of pulses by the receiving unit 700. The receiving apparatus 30 according to the present embodiment detects a pulse by using an interrupt and a timer counter, as will be described later with respect to FIG. 9, and therefore performs the configuration of the interrupt and timer counter in the reception starting state 810.

(3) Reception Processing State 820

In the reception processing state 820, the receiving apparatus 30 performs a process of receiving pulses from the communication channel 40. The receiving unit 700 sequentially receives the pulses, and instructs the pulse information storing unit 710 to store pulse information of a received pulse in an entry designated by the store pointer in the buffer 715. The receiving unit 700 then increments the store pointer.

In response to the store pointer indicating an entry after the load pointer, the searching unit 720, the adjusting unit 730, the detecting unit 740, and the identifying unit 750 search for and identify the synchronization pulse in a range before the load pointer and the store pointer.

When the pulses of all messages in the transmission unit are accumulated in the buffer 715, the receiving apparatus 30 transitions to the transmission processing state 830 in order to output the data of all messages in the transmission unit to the receiving-side apparatus. Also, in a case that the capacity of the buffer 715 is insufficient to store all messages included in the Short format or Enhanced format, in a case that a pulse transmitted as the synchronization pulse does not have a pulse period or pulse width that falls within the synchronization pulse acceptable range and the message cannot be recognized, and the like, the buffer 715 may enter a buffer-full condition before the pulses in the transmission unit are accumulated in the buffer 715 (that is, the store pointer may reach the output pointer). In this case, even when the pulses of all messages in the transmission unit are not accumulated in the buffer 715, the receiving apparatus 30 temporarily transitions to the transmission processing state 830 in response to the buffer-full condition, in order to output the data accumulated so far to the receiving-side apparatus. In this case, the receiving apparatus 30 returns to the reception processing state 820 after outputting data for a part of the transmission unit to the receiving-side apparatus, and, in response to the pulse corresponding to the last data in the transmission unit accumulated in the buffer 715, transitions to the transmission processing state 830 again in order to output the remaining data to the receiving-side apparatus.

(4) Transmission Processing State 830

In the transmission processing state 830, the receiving apparatus 30 performs a transmission process of transmitting data corresponding to pulses accumulated in the buffer 715 to the receiving-side apparatus. The extracting unit 760 finds a pulse identified as the synchronization pulse in the order from the entry pointed to by the output pointer in the buffer 715, and extracts a message. The data output unit 770 outputs reception data included in the extracted message to the receiving-side apparatus.

In the case of having transitioned to the transmission processing state 830 in order to output the data of all messages in the transmission unit, the receiving apparatus 30 transitions to the idle state 800 in response to finishing transmitting the data of all messages in the transmission unit to the receiving-side apparatus. In the case of having transitioned to the transmission processing state 830 due to the buffer-full condition, the receiving apparatus 30 resolves the buffer-full condition by transmitting data for a part of the transmission unit to the receiving-side apparatus, and thereafter transitions to the reception processing state 820 in order to receive the pulses for the remaining data. In this process, the receiving apparatus 30 may make the buffer 715 as closer to free as possible by transmitting the data included in all messages accumulated in the buffer 715 to the receiving-side apparatus.

In the case of having transitioned to the transmission processing state 830 in order to output the remaining data after outputting data for a part of the transmission unit to the receiving-side apparatus, the receiving apparatus 30 transitions to the idle state 800 in response to finishing transmitting the data of all the remaining messages to the receiving-side apparatus.

In the present embodiment, the length of 1 tick is 3 us, for example, and the pulse period is 48 us (12+4 ticks) at minimum, and thus there is a sufficient time to perform information processing involved in the data output to the receiving-side apparatus. Thus, the receiving apparatus 30 can return to the reception processing state 820 after temporarily transitioning to the transmission processing state 830 in order to resolve the buffer-full condition, during a period of waiting for the reception of one pulse. If there is not a sufficient time, the receiving apparatus 30 may enable parallel or concurrent execution of the reception processing state 820 and the transmission processing state 830.

Figure 9:
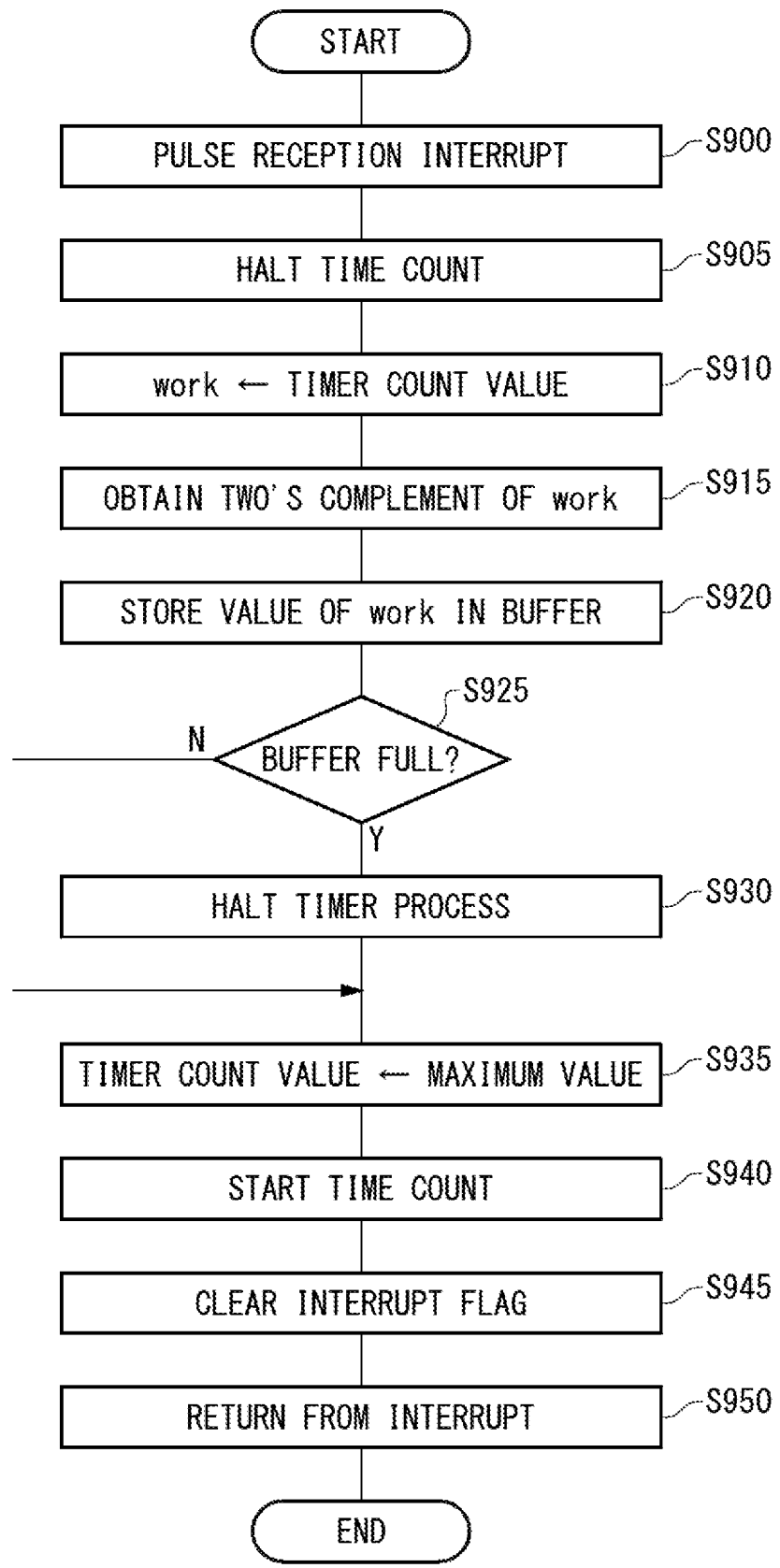
FIG. 9 shows the flow of a receiving operation of the receiving apparatus 30 according to the present embodiment.

FIG. 9 shows the flow of a receiving operation of the receiving apparatus 30 according to the present embodiment. In the example of this figure, the receiving apparatus 30 may be implemented by causing a computer including a processor such as a microcontroller, a memory, an interrupt controller, and the like, to execute a receiving program to cause the computer to function as components in the receiving apparatus 30. The receiving unit 700 performs the receiving process using an interrupt function and a timer counter function of the computer.

In the reception starting state 810 in FIG. 8, the receiving apparatus 30 configures the interrupt controller to generate an interrupt in response to detecting at least one of rise or fall of a received signal. In this manner, the receiving unit 700 generates an interrupt in response to detecting at least one of rise or fall of a received signal. The receiving unit 700 according to the present embodiment generates an interrupt in response to detecting fall (change from logical H to logical L) of a received signal. In this manner, the receiving unit 700 generates an interrupt at each time point of fall of the synchronization pulse, fall of the status pulse, fall of each data pulse of fast 1 data and fast 2 data, fall of the CRC pulse, and fall of the pause pulse as shown in FIG. 2. The receiving unit 700 can measure the pulse period of each pulse by measuring the time period between interrupts with the timer counter. The receiving unit 700 may alternatively generate an interrupt in response to rise of a received signal. The receiving unit 700 may also measure the pulse width by generating an interrupt at both of rise and fall of a received signal.

The receiving unit 700 according to the present embodiment sets the initial value of the timer counter to the maximum value, and causes a down count for each unit time of the timer counter. For example, if the time count value is in 16 bits, the receiving unit 700 sets the initial value of the time count value to 0xFFFF (hexadecimal FFFF). In this manner, the length of time counted by the timer counter is equal to the two's complement of the time count value. The unit time of the timer counter may be considerably smaller than the 1-tick time length, such as 50 ns, for example.

The receiving unit 700 performs an interrupt process shown in FIG. 9 in the reception processing state 820 in FIG. 8. At S900, the receiving unit 700 generates an interrupt in response to detecting fall of a received signal to start the interrupt process. At S905, the receiving unit 700 halts the time count by the timer counter.

At S910, the receiving unit 700 reads the time count value of the timer counter, and substitutes it for a work variable work. At S915, the receiving unit 700 obtains the two's complement of the work variable work, and calculates the number of counts from the initial value setting of the timer counter after the previous fall of the received signal to the halting of the time count at S905. This number of counts is an example of the pulse information indicating the pulse period.

At S920, the receiving unit 700 instructs the pulse information storing unit 710 to store the value of the work variable work (the number of counts) in the buffer 715. In response, the pulse information storing unit 710 stores the number of counts in an entry pointed to by the store pointer in the buffer 715, and advances the store pointer. In this manner, the pulse information storing unit 710 can store, in the buffer 715, pulse information indicating a pulse period or pulse width corresponding to the interval of generation of the interrupts.

At S925, the receiving unit 700 checks whether the buffer 715 is in a buffer-full condition. The receiving unit 700 determines the buffer-full condition in response to the store pointer reaching an output pointer of the buffer 715, that is, a pointer pointing to an entry of pulse information for which data is to be output next. The receiving unit 700 may alternatively determine a substantially buffer-full condition in response to the number of free entries being less than a lower limit value. When the buffer-full condition occurs, the receiving unit 700 halts the timer process of the timer counter to halt data acquisition at S930.

At S935, the receiving unit 700 initializes the timer count value at the maximum value in order to count the time until the next interrupt. At S940, the receiving unit 700 starts the time count of the timer counter to start the measurement of the time from fall of the received signal to the next fall thereof.

At S945, the receiving unit 700 clears an interrupt flag of the interrupt controller. At S950, the receiving unit 700 returns to the interrupted processing routine from the interrupting processing routine.

According to the receiving apparatus 30 as described above, the pulse period or pulse width of a received signal can be detected and stored in the buffer 715 by utilizing the interrupt function of a microcontroller or the like. Thus, if the receiving apparatus 30 (or an apparatus including the receiving apparatus 30 and the receiving-side apparatus) originally has a microcontroller or the like for communication processing, the addition of hardware components for receiving signals from the communication channel 40 can be minimized.

Figure 10:
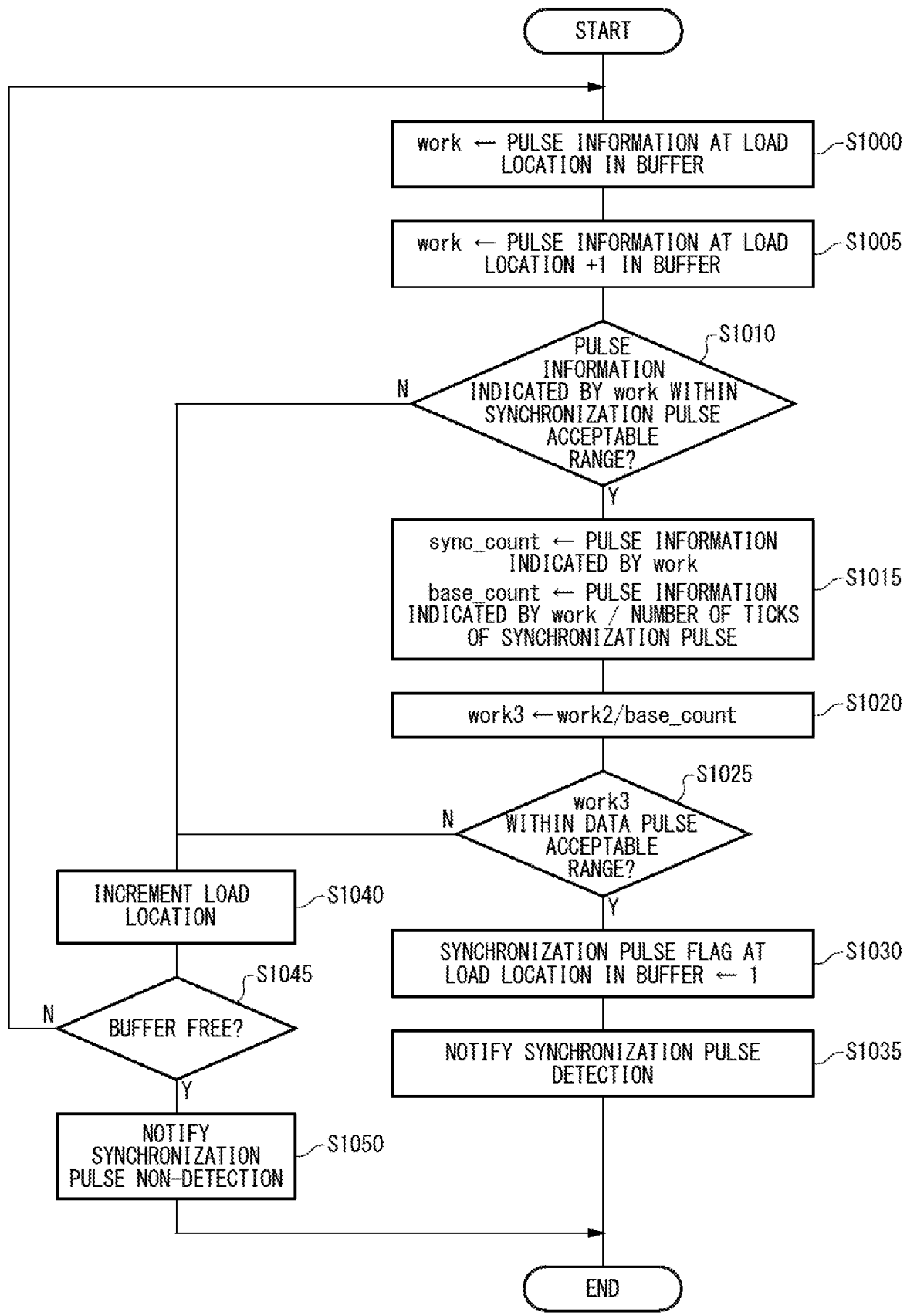
FIG. 10 shows the flow of searching for a synchronization pulse by the receiving apparatus 30 according to the present embodiment.

FIG. 10 shows the flow of searching for the synchronization pulse by the receiving apparatus 30 according to the present embodiment. In the example of this figure, the receiving apparatus 30 may be implemented by causing a computer including a processor such as a microcontroller and a memory to execute a receiving program to cause the computer to function as components in the receiving apparatus 30. The searching unit 720, the adjusting unit 730, the detecting unit 740, and the identifying unit 750 in the receiving apparatus 30 perform a process of searching for the synchronization pulse using various functions of the computer.

At S1000, the searching unit 720 substitutes pulse information of an entry at a load location in the buffer 715 (entry designated by the load counter) for a work variable work. This work variable work may be different from the work variable as shown in FIG. 9. At S1005, the searching unit 720 substitutes pulse information of an entry next to the load location in the buffer 715 for a work variable work2.

At S1010, the searching unit 720 determines whether the pulse information indicated by the work variable work falls within the synchronization pulse acceptable range. For example, if the error in pulse period that is acceptable for the synchronization pulse is ±20%, the searching unit 720 may use a range of 56 ticks±20%, that is, a range between 134.4 us (56×3 us×0.8) and 201.6 us (56×3 us×1.2) as the synchronization pulse acceptable range. Note that, if pulse information is expressed with reference to the unit time of the timer counter, the searching unit 720 may use a synchronization pulse acceptable range expressed with reference to the unit time of the timer counter.

At S1010, if the pulse information indicated by the work variable does not fall within the synchronization pulse acceptable range, the searching unit 720 determines that the subject pulse information is not that of the synchronization pulse, and advances the process to S1040. At S1040, the searching unit 720 increments the load counter to increment the load location subject to the searching process. In some implementations, the searching unit 720 may store, in the buffer 715, information indicating that the pulse information determined as being out of the synchronization pulse acceptable range is not that of the synchronization pulse in correspondence with the pulse information.

At S1045, if an entry to be checked next remains in the buffer 715 (that is, the load pointer does not reach the output pointer), the searching unit 720 advances the process to S1000 to advance the check on the pulse information stored in the next entry. If an entry to be checked next does not remain in the buffer 715 at S1045, the searching unit 720 notifies, at S1050, the routine that has called the searching process that the synchronization pulse is not detected.

At S1010, if the pulse information indicated by the work variable falls within the synchronization pulse acceptable range, the searching unit 720 determines that the pulse in the entry at the load location in the buffer 715 is the first pulse to be a candidate for the synchronization pulse. In this case, at S1015, the adjusting unit 730 substitutes the pulse information indicated by the work variable work for a variable sync count, and substitutes the value obtained by dividing the pulse information indicated by the work variable work by a prescribed number of ticks (e.g., 56) of the synchronization pulse for a variable base_count. The variable base_count indicates a 1-tick time length obtained with reference to the pulse period of the first pulse (the number of counts of the timer counter). In this manner, the adjusting unit 730 adjusts the 1-tick time length based on the pulse period or pulse width indicated by the pulse information for the first pulse and on the reference period or reference width of the synchronization pulse. In the example of this figure, the adjusting unit 730 adjusts the 1-tick time length based on the ratio of the pulse period indicated by the pulse information for the first pulse relative to the reference period of the synchronization pulse. If the pulse width is used as the pulse information, the adjusting unit 730 may adjust the 1-tick time length based on the ratio of the pulse width indicated by the pulse information for the first pulse relative to the reference pulse width of the synchronization pulse.

At S1020, the adjusting unit 730 substitutes the value obtained by dividing the work variable work2 by the variable base_count for a work variable work3. The work variable work2 is the pulse information of the second pulse at the predetermined location relative to the first pulse (next to the first pulse in the present example), and the work variable work3 is the pulse period (the number of ticks) of the second pulse obtained on condition that the first pulse has the prescribed pulse period of the synchronization pulse.

At S1025, the detecting unit 740 detects whether the value of the work variable work3 falls within the range of the number of ticks (16 to 31 ticks) that falls within the data pulse acceptable range. In this manner, the detecting unit 740 can detect whether the pulse information of the second pulse falls within the data pulse acceptable range adjusted by the adjusting unit 730 adjusting the 1-tick time length. If the pulse information of the second pulse does not fall within the data pulse acceptable range, the detecting unit 740 determines that the first pulse is not the synchronization pulse, and advances the process to S1040.

If the pulse information of the second pulse falls within the data acceptable range at S1025, the identifying unit 750 identifies the first pulse as the synchronization pulse at S1030. The identifying unit 750 stores information indicating that the first pulse is the synchronization pulse in an entry pointed to by the load pointer in the buffer 715. As an example, the identifying unit 750 may indicate that the first pulse is the synchronization pulse by setting a synchronization pulse flag, included in entries of the buffer 715, to 1. At S1035, the identifying unit 750 notifies the routine that has called the searching process that the synchronization pulse is detected.

According to the receiving apparatus 30 as described above, the synchronization pulse can be detected by additionally consider the condition that a pulse at a predetermined location relative to the synchronization pulse has a pulse period or pulse width that falls within the data pulse acceptable range, so that the synchronization pulse can be detected with higher accuracy. In the example of this figure, the detecting unit 740 determines whether pulse information of a pulse next to the synchronization pulse (the status pulse in FIG. 2) falls within the data pulse acceptable range. The detecting unit 740 may alternatively make the determination by additionally considering the condition whether pulse information of the data pulses in the fast 1 data or fast 2 data or the CRC pulse falls within the data pulse acceptable range, for example. The detecting unit 740 may also make the determination by additionally considering the condition whether pulse information of each of two or more pulses after the synchronization pulse included in the message falls within the data pulse acceptable range. Since the receiving apparatus 30 stores pulse information of a plurality of pulses in the buffer 715 before performing the process of detecting the synchronization pulse, it is easier to implement the information processing for detecting the synchronization pulse by checking the pulse periods or pulse widths of two or more pulses including the synchronization pulse and another pulse than the case of hardware-based sequential pulse processing.

Also, according to the receiving apparatus 30 as described above, the data pulse acceptable range can be adjusted based on the pulse information of the first pulse to be a candidate for the synchronization pulse. In this manner, even if the 1-tick time length in pulses transmitted by the transmitting apparatus 20 has an error relative to the 1-tick time length in the receiving apparatus 30, the receiving apparatus 30 can detect the synchronization pulse with high accuracy by checking the pulse periods or pulse widths of the data pulses after adjusting the 1-tick time length based on the pulse period or pulse width of the synchronization pulse. Note that, if the transmitting apparatus 20 and the receiving apparatus 30 operate based on the same clock, the receiving apparatus 30 may not include the adjusting unit 730.

FIG. 11 shows an example of contents stored in the buffer 715 according to the present embodiment. The buffer 715 has a plurality of buffer entries. In this figure, each buffer entry is provided with an entry number, starting from 0. The buffer entries are sequentially assigned to respective pulses received from the communication channel 40, and each include pulse information of the subject pulse and information indicating whether the subject pulse is the synchronization pulse (the synchronization pulse flag in this figure).

The pulse information indicates the pulse period or pulse width of the subject pulse received by the searching unit 720. In the example of this figure, the pulse information indicates the pulse period of the subject pulse. While the pulse information is expressed by the number of ticks for convenience of description in this figure, the buffer 715 may store information expressed in another form, such as a count value of the timer counter, as the pulse information.

The synchronization pulse flag is stored by the identifying unit 750, and is set to 1 if the subject pulse is determined as being the synchronization pulse, and to 0 if the subject pulse is determined as not being the synchronization pulse. Note that this figure shows an example in which the pulses of the message as shown in FIG. 2 are stored at entry numbers 1 to 10 in the buffer 715.

Figure 12:
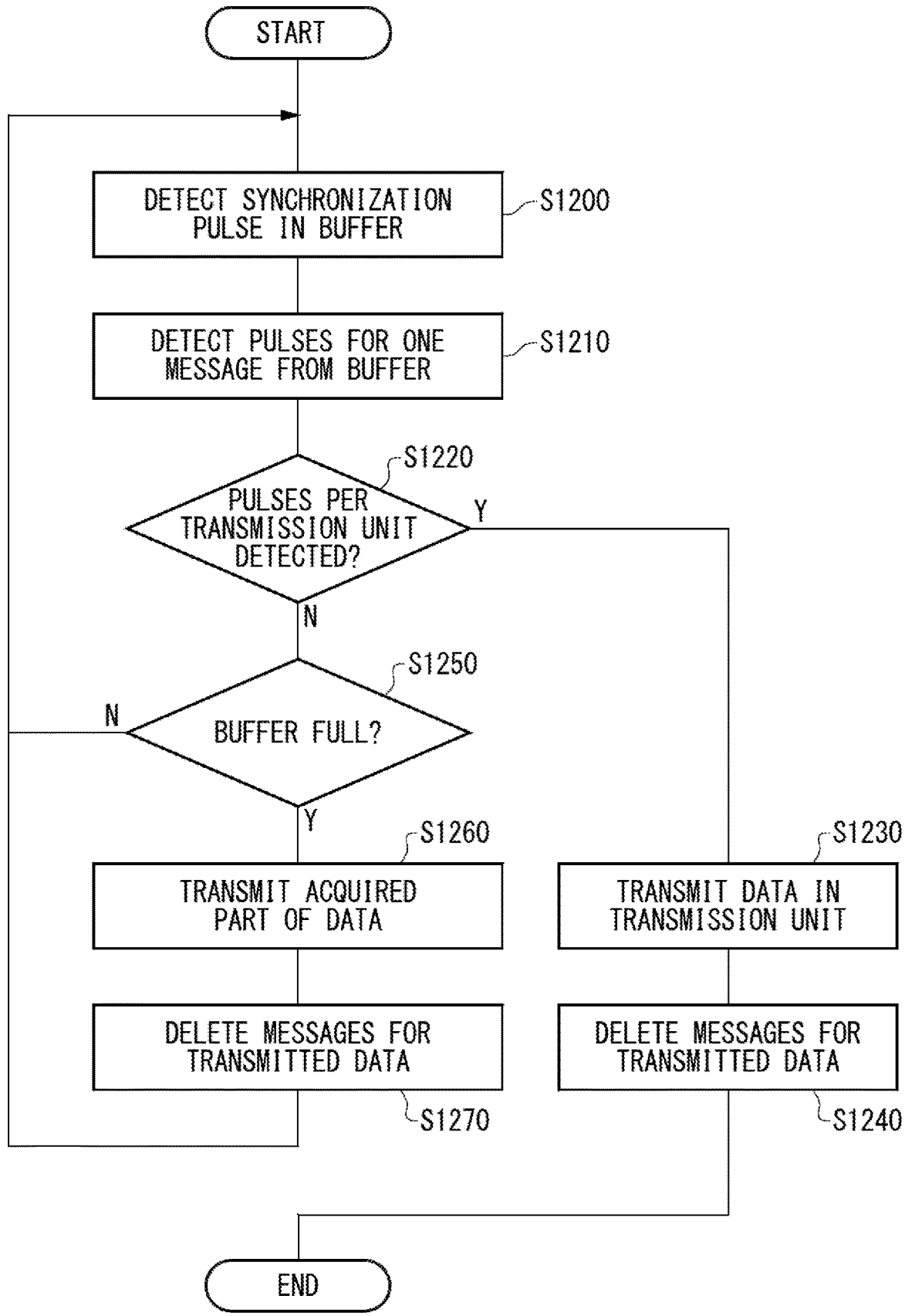
FIG. 12 shows the flow of a data output operation of the receiving apparatus 30 according to the present embodiment.

FIG. 12 shows the flow of a data output operation of the receiving apparatus 30 according to the present embodiment. In the example of this figure, the receiving apparatus 30 may be implemented by causing a computer including a processor such as a microcontroller and a memory to execute a receiving program to cause the computer to function as components in the receiving apparatus 30. The extracting unit 760 and the data output unit 770 in the receiving apparatus 30 perform a data output process of outputting data corresponding to each pulse stored in the buffer 715 to the receiving-side apparatus using various functions of the computer.

At S1200, the extracting unit 760 detects, from the buffer 715, the synchronization pulse of a message on which the data output process is to be performed next. The extracting unit 760 according to the present embodiment searches the buffer 715 while advancing the output pointer of the buffer 715 in the order from an entry pointed to by the output pointer, and detects an entry having recorded information of being the synchronization pulse (an entry whose synchronization pulse flag=1). In this manner, the extracting unit 760 discards pulses other than the synchronization pulse after the message transmitted in the previous cycle. Note that, if an entry having recorded information of being the synchronization pulse is not stored in the buffer 715, the extracting unit 760 waits until an entry corresponding to the synchronization pulse is stored in the buffer 715.

At S1210, the extracting unit 760 detects pulses for one message starting from the detected synchronization pulse stored in the buffer 715 as pulses included in the message. If entries for one message are not stored in the buffer 715, the extracting unit 760 waits until the entries for one message are stored in the buffer 715.

At S1220, the extracting unit 760 determines whether the pulses of all messages per transmission unit are detected in the buffer 715. If a message in the Short format is detected at the beginning of the transmission unit, the extracting unit 760 determines that all pulses per transmission unit are detected in response to detecting all pulses of 16 messages. If a message in the Enhanced format is detected at the beginning of the transmission unit, the extracting unit 760 determines that all pulses per transmission unit are detected in response to detecting all pulses of a number of messages prescribed for the format. If a message not including the Slow channel is detected at the beginning of the transmission unit, or if the setting not to use the Slow channel applied, the extracting unit 760 may determine that all pulses per transmission unit are detected in response to detecting all pulses of one message. The extracting unit 760 advances the process to S1230 in response to determining that all pulses per transmission unit are detected. This process transition corresponds to the state transition from the reception processing state 820 to the transmission processing state 830 when having received the data per transmission unit in FIG. 8. The extracting unit 760 advances the process to S1250 in response to determining that all pulses per transmission unit are not detected.

At S1230, the extracting unit 760 extracts, from the buffer 715, the pulses of one message with reference to the synchronization pulse as pulses included in each message for each of all messages per transmission unit. The extracting unit 760 then supplies the pulse information stored in the buffer 715 for each pulse to the data output unit 770. The extracting unit 760 according to the present embodiment reads the pulse information of the pulses of one message from the buffer 715 while advancing the output pointer of the buffer 715, for each message. The data output unit 770 transmits reception data corresponding to the pulse information of all messages per transmission unit to the receiving-side apparatus.

At S1240, the extracting unit 760 deletes the messages for the transmitted data from the buffer 715. In the case of reading the pulses of all messages while advancing the output pointer of the buffer 715, as with the extracting unit 760 according to the present embodiment, the extracting unit 760 deletes a message when the output pointer is advanced by that one message. When finishing transmitting the messages per transmission unit to the receiving-side apparatus, the extracting unit 760 ends the data output operation for that transmission unit. The extracting unit 760 causes the state of the receiving apparatus 30 to transition to the idle state 800 when the data output operation ends. If the receiving-side apparatus then instructs the receiving apparatus 30 to receive messages for the next transmission unit, the receiving apparatus 30 transitions from the idle state 800 to the reception processing state 820, to perform the flow of this figure.

If it is determined that not all pulses per transmission unit are detected at S1220, the extracting unit 760 checks whether the buffer 715 is in a buffer-full condition at S1250. If the buffer 715 is not in the buffer-full condition, the extracting unit 760 advances the process to S1200 to detect the next message in the transmission unit. If the buffer 715 is in the buffer-full condition, the extracting unit 760 advances the process to S1260 in order to free the buffer 715 by outputting data less than the transmission unit to the receiving-side apparatus. This process transition corresponds to the state transition from the reception processing state 820 to the transmission processing state 830 in FIG. 8.

At S1260, for each of one or more messages less than the transmission unit accumulated in the buffer 715, the extracting unit 760 extracts the pulses of one message with reference to the synchronization pulse as pulses included in each message. The extracting unit 760 then supplies the pulse information stored in the buffer 715 for each pulse to the data output unit 770. The extracting unit 760 according to the present embodiment reads the pulse information of the pulses of one message from the buffer 715 while advancing the output pointer of the buffer 715, for each message. The data output unit 770 transmits reception data corresponding to the pulse information of the one or more messages less than the transmission unit to the receiving-side apparatus.

At S1270, the extracting unit 760 deletes the messages for the transmitted data from the buffer 715, as in S1240. The extracting unit 760 advances the process to S1200, to perform the detection of the remaining messages in the transmission unit. This process transition corresponds to the state transition from the transmission processing state 830 to the reception processing state 820 in FIG. 8.

According to the receiving apparatus 30 as described above, messages received by the receiving apparatus 30 are temporarily stored in the buffer 715, and data per transmission unit is transmitted to the receiving-side apparatus after being completely collected. Also, even if a buffer-full condition occurs without the messages per transmission unit stored in the buffer 715 such as due to the consumption of the buffer 715 for receiving messages in which the synchronization pulse cannot be detected, the receiving apparatus 30 can receive the next message by temporarily transmitting messages less than the transmission unit to the receiving-side apparatus. Note that the receiving apparatus 30 may also detect a plurality of times of buffer-full conditions and transmit messages for a part of the transmission unit to the receiving-side apparatus before finishing transmitting the messages per transmission unit to the receiving-side apparatus.

Note that, if the receiving apparatus 30 receives a message group including a plurality of messages in which the second data is encoded in second data pulses in a divided manner, as in the Short format and the Enhanced format, all messages included in the message group may be a transmission unit, as described with respect to S1220. Each message includes the synchronization pulse, first data pulses having data pulse widths corresponding to the values of the first data (e.g., a fast 1 data pulse and a fast 2 data pulse), and a second data pulse having a data pulse width corresponding to the value of partial data in which the second data is encoded in a divided manner (e.g., a status pulse).

In this case, at S1220, the extracting unit 760 may detect the starting message of a message group including a plurality of messages in which the second data is encoded in a divided manner based on pulse information of each message stored in the buffer 715, and extract the pulses of the plurality of messages included in the message group. Specifically, the extracting unit 760 checks the respective formats of a series of messages stored in the buffer 715 to identify which message is the starting message of the message group.

The extracting unit 760 according to the present embodiment checks serial data bit 3 encoded in the status pulse of each message to identify the location of each message in the formats as shown in FIGS. 4 to 6. For example, if it is confirmed that serial data bit 3 of message A is 1 and serial data bit 3 of 15 messages following message A is 0, the extracting unit 760 detects that message A is the starting message of a message group in the Short format, and identifies that the 15 messages following message A are messages at the corresponding locations in the Short format. Also, for example, if serial data bit 3 of six successive messages starting from message B is 1 and serial data bit 3 of two following messages is 0, the extracting unit 760 detects that message B is the starting message of the message group in FIG. 5 in the Enhanced format in which the configuration bit is 0, and identifies that 17 messages following message B are messages at the corresponding locations in the Enhanced format (configuration bit=0). The extracting unit 760 may further confirm that serial data bit 3 of the 13th and 18th messages is 0, given message B is the first one.

In this manner, the extracting unit 760 can check the format of a message group including a plurality of messages by using pulse information of two or more messages stored in the buffer 715, and the possibility of misdetecting the starting message of the message group and supplying erroneous second data to the transmitting-side apparatus can be largely reduced.

In order to identify the starting message by checking all messages to be included in the transmission unit, the extracting unit 760 may perform the process of detecting the starting message of a message group in response to a number of messages stored in the buffer 715 which number is greater than the number of messages to be included in the message group. If the number of messages included in a message group varies depending on the format, as in the Short format and the Enhanced format, for example, the extracting unit 760 may perform the process of detecting the starting message of a message group after a number of pulses corresponding to all messages for the format having the maximum number of messages are stored in the buffer 715.

Also, the extracting unit 760 may detect the starting message of a message group in response to a number of messages stored in the buffer 715 which number is greater than or equal to a predetermined number greater than or equal to twice the number of messages to be included in the message group minus one. By performing the detection of the starting message in response to a number of messages stored in the buffer 715 which number is approximately twice the number of messages included in the message group, the extracting unit 760 can reliably detect the starting message of the message group unless a large communication error occurs, and can extract all pulses of all messages of the message group including the starting message from the buffer 715.

As described above, if the second data is supplied to the transmitting-side apparatus after all messages of a message group are extracted, the extracting unit 760 may extract the first data from the buffer 715 in a transmission unit shorter than one message or the like and supply it to the transmitting-side apparatus prior to the second data.

Figure 13:
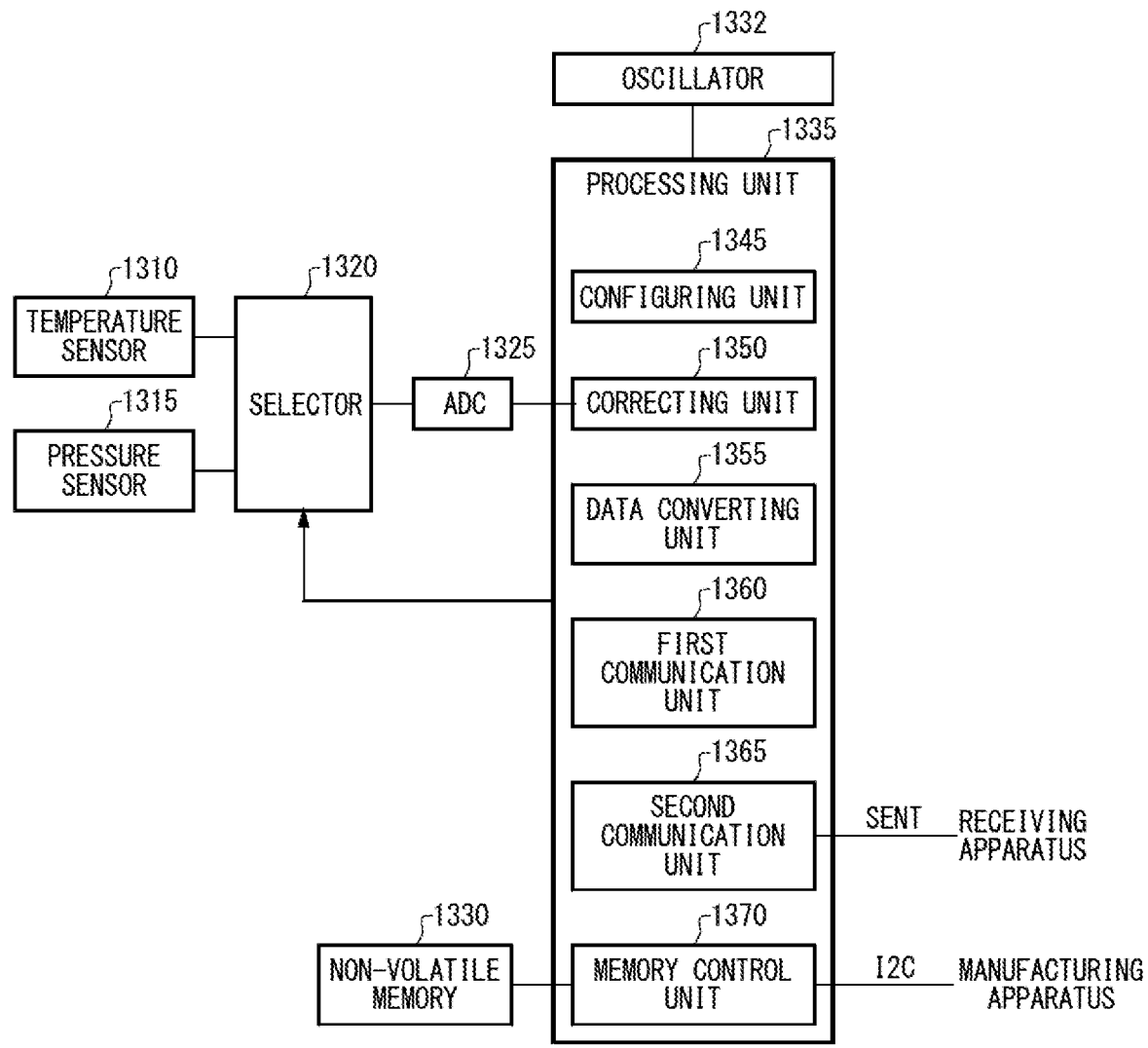
FIG. 13 shows the configuration of a device 1300 according to the present embodiment.

FIG. 13 shows the configuration of a device 1300 according to the present embodiment. The device 1300 is a sensor device that transmits, to the receiving apparatus 30 via the communication channel 40, sense data detected by sensors such as a temperature sensor 1310 and a pressure sensor 1315. That is, the device 1300 according to the present embodiment has a function as the transmitting-side apparatus in FIG. 1 to generate data such as sense data to be transmitted to the receiving apparatus 30 and a function as the transmitting apparatus 20 in FIG. 1 to transmit the generated data to the receiving apparatus 30. As an example, the device 1300 may be implemented by an IC (integrated circuit), an LSI (large-scale integrated circuit), or the like, and may be implemented in one package. The device 1300 may alternatively be implemented as a multi-chip module in which a plurality of chips including a chip for the temperature sensor 1310, a chip for the pressure sensor 1315, a processing unit 1335, and the like are mounted on a substrate, for example.

The device 1300 includes the temperature sensor 1310, the pressure sensor 1315, a selector 1320, an ADC 1325 (AD converter 1325), a non-volatile memory 1330, an oscillator 1332, and the processing unit 1335. The temperature sensor 1310 detects the temperature outside the device 1300, and outputs sense data corresponding to the detected temperature. The pressure sensor 1315 detects the pressure outside the device 1300, and outputs sense data corresponding to the detected pressure. The device 1300 may alternatively or additionally include one or more other types of sensors.

The selector 1320 is connected to sense data outputs of the temperature sensor 1310 and the pressure sensor 1315, and switches whether sense data of the temperature sensor 1310 or the pressure sensor 1315 is supplied to the ADC 1325, based on controls from the processing unit 1335. The selector 1320 may be connected to at least one of another sensor and an external sensor such as a thermistor externally connected to the device 1300, and may be able to switch sense data supplied to the ADC 1325, including sense data from these sensors. The ADC 1325 is connected to the selector 1320, and converts analog sense data selected by the selector 1320 into digital sense data.

The non-volatile memory 1330 stores various types of information used by the device 1300. The non-volatile memory 1330 according to the present embodiment is a flash memory, an EEPROM, or the like, in which batch erasure of all storage cells, such as 4K bits, are possible but write of only a portion is impossible, for example. The oscillator 1332 outputs a clock signal to operate the device 1300. In this figure, the oscillator 1332 supplies a clock signal to the processing unit 1335. The oscillator 1332 may supply a clock signal to at least one of the sensors, the selector 1320, the ADC 1325, and the non-volatile memory 1330 in the device 1300, as needed.

The processing unit 1335 is connected to the ADC 1325, the non-volatile memory 1330, and the oscillator 1332. The processing unit 1335 operates based on the clock signal from the oscillator 1332, and receives sense data from the ADC 1325 and transmits it to the receiving apparatus 30 via the communication channel 40 (SENT communication channel in the present example). The processing unit 1335 also performs processes such as adjustment of circuits in the device 1300, correction of sense data, read and write of the non-volatile memory 1330, and the like.

As an example, the processing unit 1335 according to the present embodiment is implemented by circuits including program execution in a microcontroller or the like. The processing unit 1335 may alternatively be implemented by circuits dedicated for the device 1300.

The processing unit 1335 includes a configuring unit 1345, a correcting unit 1350, a data converting unit 1355, a first communication unit 1360, a second communication unit 1365, and a memory control unit 1370. The configuring unit 1345 configures configuration parameters, various configurable registers, and the like in a main memory of the processing unit 1335 in a process of initializing the device 1300. In the process of initializing the device 1300, the configuring unit 1345 according to the present embodiment reads, via the memory control unit 1370, various configuration values written in the non-volatile memory 1330 in advance, and configures them in corresponding memory regions, registers, and the like in the processing unit 1335.

For example, the correcting unit 1350 switches the selector 1320 at a predetermined period, and acquires temperature sense data from the temperature sensor 1310 and pressure sense data from the pressure sensor 1315. Since the acquired sense data contains an error specific to the individual device 1300, the correcting unit 1350 performs correction depending on the type of the acquired sense data. The correcting unit 1350 performs a correction process using correction parameters configured by the configuring unit 1345.

The data converting unit 1355 converts the sense data corrected by the correcting unit 1350 into a data form to be transmitted to the communication channel 40. The data converting unit 1355 performs parallel-serial conversion, conversion into a message format to be transmitted, and any other necessary data conversion.

The first communication unit 1360 is an example of a first serial interface, and transmits, to the communication channel 40, the data converted into the format of a message by the data converting unit 1355. As an example, the first communication unit 1360 according to the present embodiment is a transmitting interface for SENT, and transmits, to the receiving apparatus 30 via a SENT communication channel, a message including sense data detected in the actual application of the device 1300. Such a message may include the sense data in at least one of the fast 1 data and fast 2 data as shown in FIG. 2. The data converting unit 1355 may encode manufacture-specific data specific to the individual device 1300 or the like in the Slow channel of a SENT message, for example, and the first communication unit 1360 may transmit the message in which the manufacture-specific data or the like is encoded to the communication channel 40.

The second communication unit 1365 is an example of a second serial interface, and is a communication interface mainly used in manufacturing the device 1300. The second communication unit 1365 according to the present embodiment may be a bi-directional serial interface, and is a I2C communication interface, as an example. In response to receiving, from a manufacturing apparatus of the device 1300 (or a writing apparatus provided in the manufacturing site), a memory write command that instructs to write into the non-volatile memory 1330 various types of information that should be configured in the non-volatile memory 1330 before shipping of the device 1300, the second communication unit 1365 writes the to-be-written information into the non-volatile memory 1330 via the memory control unit 1370. This memory write command is an example of a write request to the non-volatile memory 1330. Also, the second communication unit 1365 reads the contents of the non-volatile memory 1330 via the memory control unit 1370 and sends them back to the manufacturing apparatus or the like in response to receiving a memory read command of the non-volatile memory 1330 from the manufacturing apparatus or the like. Also, in response to receiving, from the manufacturing apparatus or the like, a register write command or register read command that instructs a write or read to a register or the like other than the non-volatile memory 1330 in the device 1300, the second communication unit 1365 performs the write or read to the register or the like.

If all the parameter values, register values and the like configured by the configuring unit 1345 during the initialization process are written in the non-volatile memory 1330 before shipping of the device 1300, the device 1300 can optimally operate in a stand-alone manner in the environment of actual application. Therefore, the device 1300 usually does not need to perform communication via the second communication unit 1365 after shipping of the device 1300. However, if a manufacturer that is supplied with the device 1300 and incorporates it into an apparatus such as an automobile wishes to change the configuration of the supplied device 1300 for the company's apparatuses, for example, a communication function via the second communication unit 1365 may be utilized.

The memory control unit 1370 controls batch erasure, memory write and memory read of the non-volatile memory 1330. In response to a batch erasure command received by the second communication unit 1365 from the I2C communication interface, the memory control unit 1370 performs batch erasure on the non-volatile memory 1330. Also, in response to a memory write command received by the second communication unit 1365 from the I2C communication interface, the memory control unit 1370 writes to-be-written information or data in the non-volatile memory 1330. Also, in response to a memory read command received by the second communication unit 1365 from the I2C communication interface, the memory control unit 1370 reads information or data from a to-be-read address in the non-volatile memory 1330 and sends it back via the I2C communication interface.

FIG. 14 shows an example of information stored in the non-volatile memory 1330 according to the present embodiment. The non-volatile memory 1330 according to the present embodiment stores a plurality of categories of information such as adjustment information, correction information, configuration information, and manufacture information in a storage space subject to batch erasure.

The adjustment information is information for adjusting circuits in the device 1300. As an example, the device 1300 according to the present embodiment stores, in the non-volatile memory 1330, adjustment information such as oscillator-adjustment data for adjusting the oscillation frequency of the oscillator 1332, and ADC adjustment data for adjusting the output of the ADC 1325 to output an output digital value that is linear with respect to an input analog value.

The correction information is information for correcting values of sense data output by the temperature sensor 1310 and the pressure sensor 1315. As an example, the device 1300 according to the present embodiment stores, in the non-volatile memory 1330, correction information such as temperature correction data for correcting sense data from the temperature sensor 1310, and pressure correction data for correcting sense data from the pressure sensor 1315.

The configuration information is information for configuring configurable operational properties of the device 1300. The operational properties required for the device 1300 may vary depending on the supplyee. The device 1300 has a configuration function for performing configuration appropriate for the supplyee of the device 1300, and functions as a product specialized for the supplyee by storing the configuration information in the non-volatile memory 1330. As an example, the device 1300 according to the present embodiment stores, in the non-volatile memory 1330, configuration information including communication configuration information ("communication configuration data" in the figure) for configuring a communication function via the first communication unit 1360 in the device 1300. Such communication configuration data is used for configuring the content of data encoded in the Slow channel for the SENT protocol, for example.

The manufacture information is information about the manufacture of the device 1300. As an example, the device 1300 according to the present embodiment stores manufacture-specific data specific to the manufacture of the device 1300 in the non-volatile memory 1330. The manufacture-specific data may include at least one of the manufacturing date of the device 1300, identification information of a wafer from which the device 1300 is cut out, location information of the device 1300 in the wafer, information of the manufacturing site of the device 1300, information of the manufacturer of the device 1300, and the manufacturing number of the device 1300.

Note that the device 1300 may not contain at least one of the adjustment information, correction information, configuration information, and manufacture information in the non-volatile memory 1330. Also, the device 1300 may store, in the non-volatile memory 1330, other types of information such as information for identifying the individual of the device 1300 such as at least one of the product name, product number, and serial number of the device 1300, for example.

Figure 15:
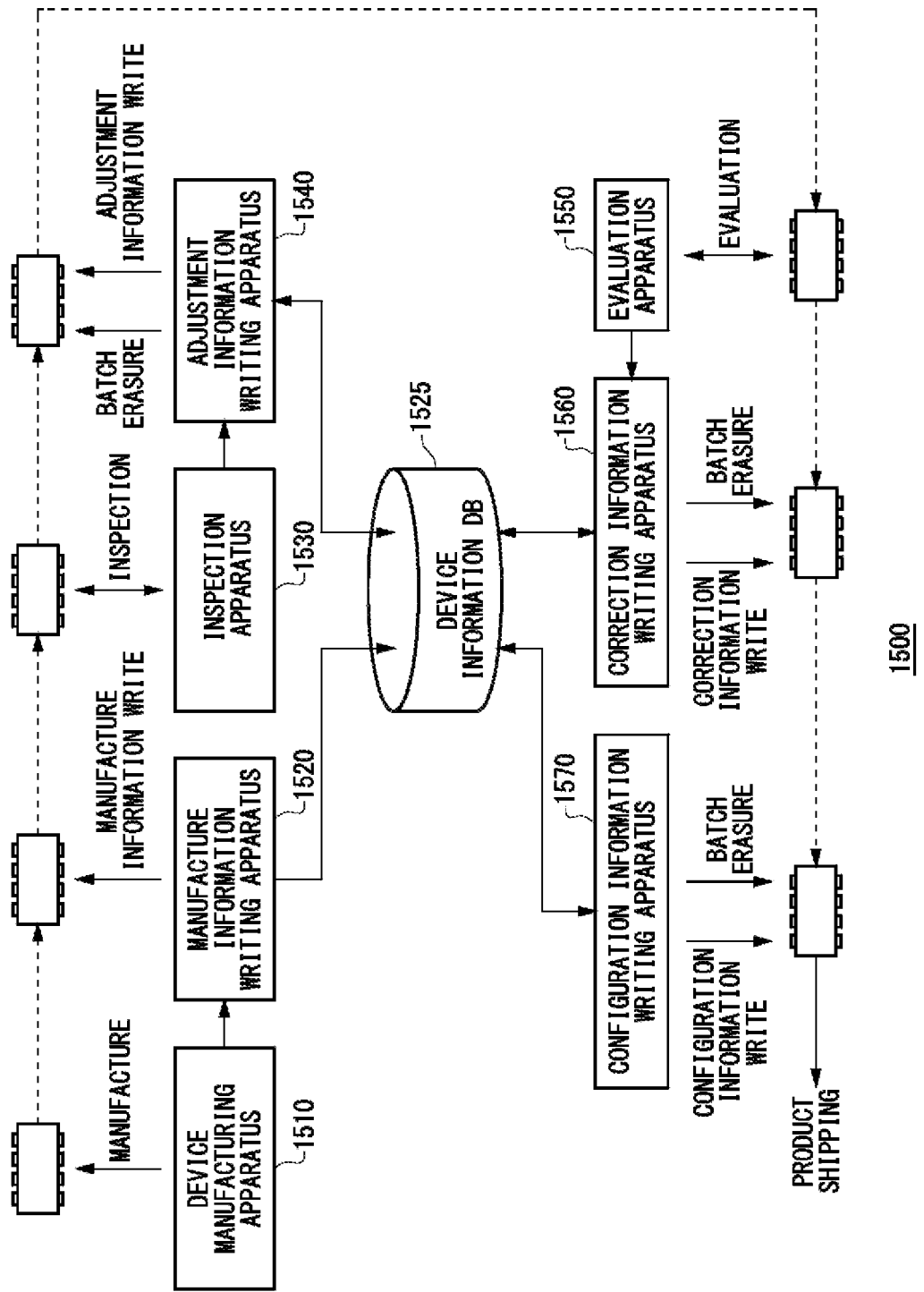
FIG. 15 shows an example of a manufacturing system 1500 according to the present embodiment.

FIG. 15 shows an example of a manufacturing system 1500 according to the present embodiment. The manufacturing system 1500 manufactures the device 1300, writes the information shown in FIG. 14 in the non-volatile memory 1330 before shipping of the device 1300, and completes the device 1300 ready for product shipping. In the manufacturing system 1500, information to be written in the non-volatile memory 1330 occurs at a plurality of steps until the product completion. However, the non-volatile memory 1330 cannot be subject to write of only part of the storage space while batch erasure is enabled, in order to reduce the size and cost of the device 1300. Thus, the manufacturing system 1500 according to the present embodiment writes first information in the non-volatile memory 1330 and thereafter acquires second information to be written in the non-volatile memory 1330, and then performs batch erasure on the non-volatile memory 1330 in which the original first information is written, before performing the process of writing the original first information and the new second information in the non-volatile memory 1330.

The manufacturing system 1500 includes a device manufacturing apparatus 1510, a manufacture information writing apparatus 1520, a device information DB 1525, an inspection apparatus 1530, an adjustment information writing apparatus 1540, an evaluation apparatus 1550, a correction information writing apparatus 1560, and a configuration information writing apparatus 1570. These apparatuses are used for manufacturing the device 1300 in combination, and function as manufacturing apparatuses or a manufacturing apparatus group for the device 1300.

The device manufacturing apparatus 1510 manufactures the device 1300 including the batch-erasable non-volatile memory 1330. The device 1300 at this stage is an intermediate product in the process of manufacture, in which necessary information for functioning as a product is not written in the non-volatile memory 1330. The device manufacturing apparatus 1510 may include a plurality of process apparatuses for manufacturing the device 1300. Examples of such process apparatuses include an etching apparatus, a film forming apparatus, an exposure apparatus, a dicing apparatus, a handler apparatus, a wire-bonding apparatus, a molding apparatus, an inspection apparatus, and the like.

The device manufacturing apparatus 1510 supplies manufacture information about the manufacture of the manufactured device 1300 to the manufacture information writing apparatus 1520. Incidentally, the device manufacturing apparatus 1510 moves semiconductor chips diced from a wafer onto a tray using a picker, and picks up them from the tray for packaging. Thus, the device manufacturing apparatus 1510 can identify when and from which location of which wafer the semiconductor chip included in each device 1300 is cut out, by tracing such movements of the semiconductor chips. Therefore, the manufacturing system 1500 can incorporate, into the manufacture information, information such as identification information of the wafer from which the device 1300 is cut out, and location information of the device 1300 in the wafer.

The manufacture information writing apparatus 1520 is connected to the second communication unit 1365 of the device 1300 after the manufacture by the device manufacturing apparatus 1510, and writes the manufacture information received from the device manufacturing apparatus 1510 in the non-volatile memory 1330 of each device 1300 manufactured by the device manufacturing apparatus 1510. The manufacture information writing apparatus 1520 may initialize the non-volatile memory 1330 by performing batch erasure before writing the manufacture information. Also, if it is needed to perform batch write of data in the entire storage space of the non-volatile memory 1330, batch write data is generated including the manufacture information received from the device manufacturing apparatus 1510 and unacquired information such as dummy correction information, configuration information, and manufacture information, and is written in the non-volatile memory 1330 via the second communication unit 1365. Also, in response to writing the manufacture information in the non-volatile memory 1330 of the device 1300, the manufacture information writing apparatus 1520 registers the manufacture information with the device information DB 1525 in correspondence with that device 1300.

The device information DB 1525 stores information written in the non-volatile memory 1330 of each of a plurality of devices 1300 manufactured by the device manufacturing apparatus 1510 in correspondence with that device 1300. In the present embodiment, since batch erasure is performed on the non-volatile memory 1330 in each device 1300, even if first information is written in the non-volatile memory 1330 at a step during manufacture, batch erasure of the non-volatile memory 1330 needs to be performed before different, second information is written in the non-volatile memory 1330 at another step. Thus, the device information DB 1525 stores information written in the non-volatile memory 1330 in correspondence with each device 1300.

The inspection apparatus 1530 inspects the device 1300, and generates adjustment information corresponding to the inspection result of the device 1300. For example, the inspection apparatus 1530 measures the oscillation frequency of the oscillator 1332 in operation, and generates oscillator adjustment data for adjusting the oscillation frequency of the oscillator 1332 to fall within a predetermined error range relative to a target frequency based on the measurement result. The inspection apparatus 1530 can measure the oscillation frequency of the oscillator 1332 such as by using a counter in the device 1300 to measure divided pulses of the clock signal during a predetermined measurement period, for example.

Also, for example, the inspection apparatus 1530 measures an output analog value with respect to an input analog value by operating the ADC 1325, and generates ADC adjustment data for adjusting the output of the ADC 1325 based on the measurement result. For example, the inspection apparatus 1530 configures the device 1300 to sequentially input one or more constant voltages in the device 1300 to the ADC 1325 to read, via the second communication unit 1365, output digital values responsively output by the ADC 1325. The inspection apparatus 1530 may generate ADC adjustment data using a plurality of output digital values obtained in this manner. Also, if the device 1300 has an input terminal from an external sensor, the inspection apparatus 1530 may input one or more voltages to the device 1300 via the input terminal, and generate ADC adjustment data using output digital values output by the ADC 1325 in response to the respective voltages. The inspection apparatus 1530 supplies the generated adjustment information to the adjustment information writing apparatus 1540.

The adjustment information writing apparatus 1540 is connected to the device 1300 after the inspection by the inspection apparatus 1530, and writes the adjustment information received from the inspection apparatus 1530 for each inspected device 1300 in the non-volatile memory 1330 of the device 1300. In the present embodiment, the adjustment information writing apparatus 1540 performs batch erasure on the non-volatile memory 1330 of the device 1300 in which information (the manufacture information in this step) is already written, before writing the adjustment information. The adjustment information writing apparatus 1540 acquires information registered with the device information DB 1525 for the information erased by the batch erasure, and writes it in the non-volatile memory 1330 of the device 1300 via the second communication unit 1365 together with newly acquired information (the adjustment information in this step). Also, in response to writing the adjustment information in the non-volatile memory 1330 of the device 1300, the adjustment information writing apparatus 1540 registers the adjustment information with the device information DB 1525 in correspondence with that device 1300.

The evaluation apparatus 1550 evaluates a sensor of the device 1300, and generates correction information based on the evaluation result for the sensor of the device 1300. For example, the evaluation apparatus 1550 varies the atmospheric temperature outside the device 1300, and receives sense data from the temperature sensor 1310 via the first communication unit 1360. The evaluation apparatus 1550 uses the sense data thus acquired under various temperatures to generate temperature correction data for correcting the value of the sense data from the temperature sensor 1310. Alternatively, for example, the evaluation apparatus 1550 varies the atmospheric pressure outside the device 1300, and receives sense data from the pressure sensor 1315 via the first communication unit 1360. The evaluation apparatus 1550 uses the sense data thus acquired under various atmospheric pressures to generate pressure correction data for correcting the value of the sense data from the pressure sensor 1315. The evaluation apparatus 1550 supplies the generated adjustment information to the correction information writing apparatus 1560.

The correction information writing apparatus 1560 is connected to the device 1300 after the evaluation by the evaluation apparatus 1550, and writes the correction information received from the evaluation apparatus 1550 for each evaluated device 1300 in the non-volatile memory 1330 of the device 1300. In the present embodiment, the correction information writing apparatus 1560 performs batch erasure on the non-volatile memory 1330 of the device 1300 in which information (the manufacture information and the adjustment information in this step) is already written, before writing the correction information. The correction information writing apparatus 1560 acquires information registered with the device information DB 1525 for the information erased by the batch erasure, and writes it in the non-volatile memory 1330 of the device 1300 via the second communication unit 1365 together with newly acquired information (the correction information in this step). Also, in response to writing the correction information in the non-volatile memory 1330 of the device 1300, the correction information writing apparatus 1560 registers the correction information with the device information DB 1525 in correspondence with that device 1300.

The configuration information writing apparatus 1570 is connected to the device 1300 after finishing the write of the manufacture information, adjustment information, correction information, and the like that should be written in the non-volatile memory 1330 for all products in common, and acquires configuration information for performing configuration appropriate for the supplyee of the device 1300 in response to an input from the manager of the manufacturing system 1500 or the like. In the present embodiment, the configuration information writing apparatus 1570 performs batch erasure on the non-volatile memory 1330 of the device 1300 in which information (the manufacture information, the adjustment information, and the correction information in this step) is already written, before writing the configuration information. The correction information writing apparatus 1560 acquires information registered with the device information DB 1525 for the information erased by the batch erasure, and writes it in the non-volatile memory 1330 of the device 1300 via the second communication unit 1365 together with newly acquired information (the configuration information in this step). Also, in response to writing the configuration information in the non-volatile memory 1330 of the device 1300, the correction information writing apparatus 1560 registers the configuration information with the device information DB 1525 in correspondence with that device 1300.

According to the manufacturing system 1500 as described above, even if batch erasure is needed for a write to the non-volatile memory 1330, information generated at a plurality of points of the manufacturing process can be sequentially written in the non-volatile memory 1330. Note that, while the manufacturing system 1500 as described above writes the manufacture information, the adjustment information, the correction information, and the configuration information in the non-volatile memory 1330 in this order, the manufacturing system 1500 may alternatively write the various information in the non-volatile memory 1330 in any order depending on the manufacturing process.

In the manufacturing system 1500 as described above, the manufacture information writing apparatus 1520, the adjustment information writing apparatus 1540, the correction information writing apparatus 1560, and the configuration information writing apparatus 1570 register written information with the device information DB 1525 in response to writing the information in the non-volatile memory 1330. Alternatively, at least one of the device manufacturing apparatus 1510, the inspection apparatus 1530, the evaluation apparatus 1550, and the configuration information writing apparatus 1570 may temporarily register generated information with the device information DB 1525. In this case, corresponding one of the manufacture information writing apparatus 1520, the adjustment information writing apparatus 1540, the correction information writing apparatus 1560, and the configuration information writing apparatus 1570 may acquire information already written in the non-volatile memory 1330 and information to be newly written in the non-volatile memory 1330 from the device information DB 1525 to write them in the non-volatile memory 1330.

Also, at least one of the manufacture information writing apparatus 1520, the adjustment information writing apparatus 1540, the correction information writing apparatus 1560, and the configuration information writing apparatus 1570 may read, from the device 1300 to which it is connected, information (such as serial number) that can identify the individual device 1300 before the batch erasure to confirm whether it matches with the device 1300 recognized by the manufacturing system 1500. In this manner, if an error occurs in tracing a device 1300, the manufacturing system 1500 can prevent information for another device 1300 from being written in the device 1300.

Also, the manufacturing system 1500 may not include the device information DB 1525. In such configuration, for writing first information already written in the non-volatile memory 1330 (original information) and second information (new information), the manufacture information writing apparatus 1520, the adjustment information writing apparatus 1540, the correction information writing apparatus 1560, and the configuration information writing apparatus 1570 may perform batch erasure on the non-volatile memory 1330 after reading the first information from the non-volatile memory 1330 in which the first information is written before writing the read first information and the new second information in the non-volatile memory 1330.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Computer-readable media may include any tangible device that can store instructions for execution by a suitable device, such that the computer-readable medium having instructions stored therein comprises an article of manufacture including instructions which can be executed to create means for performing operations specified in the flowcharts or block diagrams. Examples of computer-readable media may include an electronic storage medium, a magnetic storage medium, an optical storage medium, an electromagnetic storage medium, a semiconductor storage medium, etc. More specific examples of computer-readable media may include a floppy disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY® disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA, C++, etc., and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), wide area network (WAN) such as the Internet, etc., to execute the computer-readable instructions to create means for performing operations specified in the flowcharts or block diagrams. Examples of processors include computer processors, processing units, microprocessors, digital signal processors, controllers, microcontrollers, etc.

Figure 16:
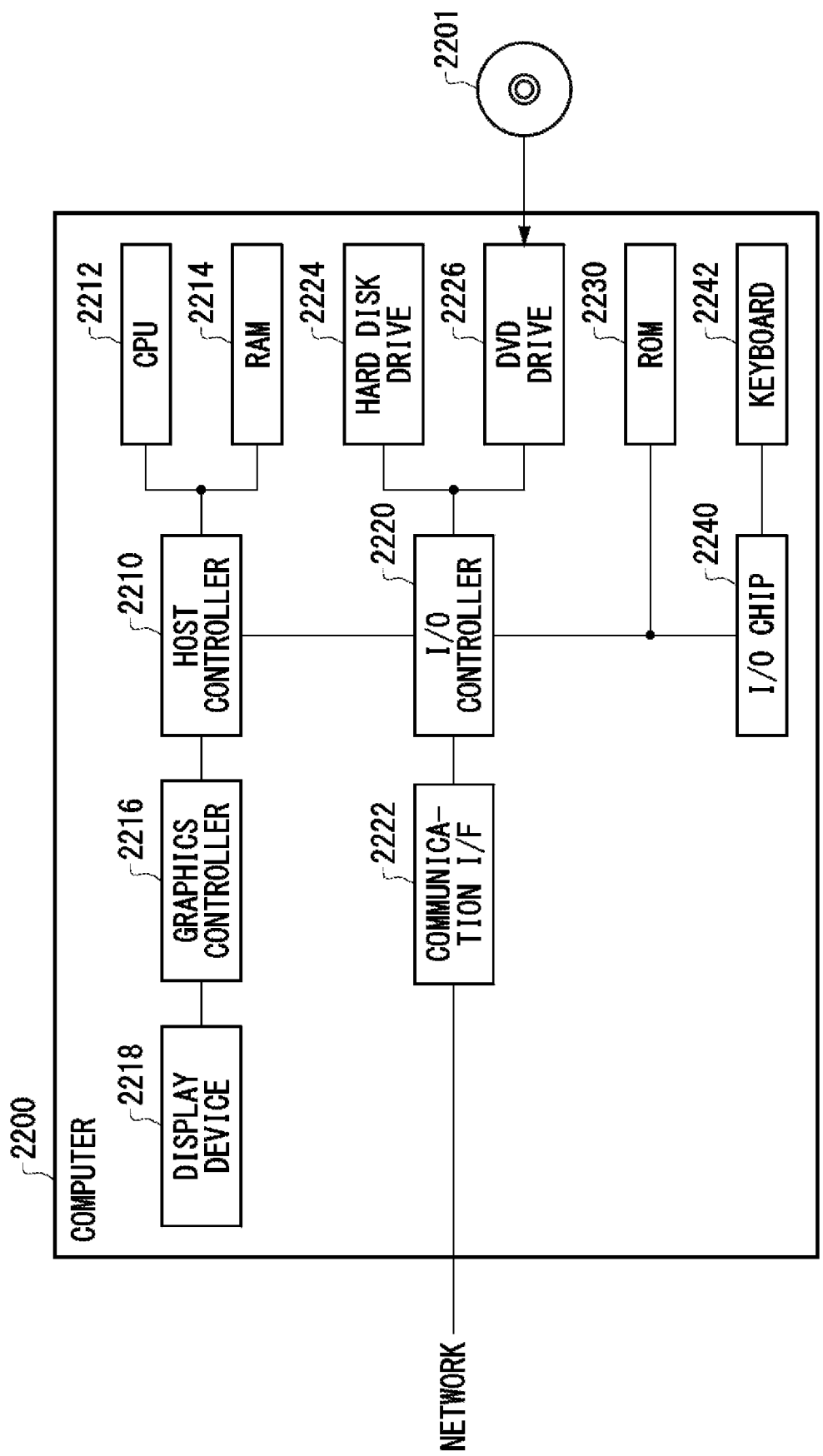
FIG. 16 shows an example of the configuration of a computer 2200 according to the present embodiment.

FIG. 16 shows an example of a computer 2200 in which aspects of the present invention may be wholly or partly embodied. A program that is installed in the computer 2200 can cause the computer 2200 to function as or perform operations associated with apparatuses of the embodiments of the present invention or one or more sections thereof, and/or cause the computer 2200 to perform processes of the embodiments of the present invention or steps thereof. Such a program may be executed by the CPU 2212 to cause the computer 2200 to perform certain operations associated with some or all of the blocks of flowcharts and block diagrams described herein.

The computer 2200 according to the present embodiment includes a CPU 2212, a RAM 2214, a graphics controller 2216, and a display device 2218, which are mutually connected by a host controller 2210. The computer 2200 also includes input/output units such as a communication interface 2222, a hard disk drive 2224, a DVD-ROM drive 2226 and an IC card drive, which are connected to the host controller 2210 via an input/output controller 2220. The computer also includes legacy input/output units such as a ROM 2230 and a keyboard 2242, which are connected to the input/output controller 2220 through an input/output chip 2240.

The CPU 2212 operates according to programs stored in the ROM 2230 and the RAM 2214, thereby controlling each unit. The graphics controller 2216 obtains image data generated by the CPU 2212 on a frame buffer or the like provided in the RAM 2214 or in itself, and causes the image data to be displayed on the display device 2218.

The communication interface 2222 communicates with other electronic devices via a network. The hard disk drive 2224 stores programs and data used by the CPU 2212 within the computer 2200. The DVD-ROM drive 2226 reads the programs or the data from the DVD-ROM 2201, and provides the hard disk drive 2224 with the programs or the data via the RAM 2214. The IC card drive reads programs and data from an IC card, and/or writes programs and data into the IC card.

The ROM 2230 stores therein a boot program or the like executed by the computer 2200 at the time of activation, and/or a program depending on the hardware of the computer 2200. The input/output chip 2240 may also connect various input/output units via a parallel port, a serial port, a keyboard port, a mouse port, and the like to the input/output controller 2220.

A program is provided by computer readable media such as the DVD-ROM 2201 or the IC card. The program is read from the computer readable media, installed into the hard disk drive 2224, RAM 2214, or ROM 2230, which are also examples of computer readable media, and executed by the CPU 2212. The information processing described in these programs is read into the computer 2200, resulting in cooperation between a program and the above-mentioned various types of hardware resources. An apparatus or method may be constituted by realizing the operation or processing of information in accordance with the usage of the computer 2200.

For example, when communication is performed between the computer 2200 and an external device, the CPU 2212 may execute a communication program loaded onto the RAM 2214 to instruct communication processing to the communication interface 2222, based on the processing described in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording medium.

In addition, the CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), the IC card, etc., and perform various types of processing on the data on the RAM 2214. The CPU 2212 may then write back the processed data to the external recording medium.

Various types of information, such as various types of programs, data, tables, and databases, may be stored in the recording medium to undergo information processing. The CPU 2212 may perform various types of processing on the data read from the RAM 2214, which includes various types of operations, processing of information, condition judging, conditional branch, unconditional branch, search/replace of information, etc., as described throughout this disclosure and designated by an instruction sequence of programs, and writes the result back to the RAM 2214. In addition, the CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable media on or near the computer 2200. In addition, a recording medium such as a hard disk or a RAM provided in a server system connected to a dedicated communication network or the Internet can be used as the computer readable media, thereby providing the program to the computer 2200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:
1. A receiving apparatus comprising:
a receiving unit configured to receive a plurality of pulses including a synchronization pulse having a predetermined synchronization pulse width, a first data pulse having a data pulse width corresponding to a value of first data, and a second data pulse having a data pulse width corresponding to a value of partial data in which second data is encoded in a divided manner;
a pulse information storing unit configured to store, in a buffer, pulse information indicating a pulse period or pulse width of each of the plurality of pulses included in a message;
a searching unit configured to search for a first pulse indicating a pulse period or pulse width that falls within a synchronization pulse acceptable range from among a plurality of pieces of pulse information stored in the buffer for the plurality of pulses;
a detecting unit configured to detect a second pulse at a predetermined location relative to the first pulse, where a pulse period or pulse width of the second pulse falls within a data pulse acceptable range; and
an identifying unit configured to identify the first pulse as the synchronization pulse on condition that
the pulse period or pulse width of the first pulse falls within the synchronization pulse acceptable range,
the pulse period or pulse width of the second pulse falls within the data pulse acceptable range, and
the second pulse is at the predetermined location with respect to the first pulse, an extracting unit configured to detect, based on the pulse information of each message stored in the buffer, a starting message of a message group including a plurality of messages in which the second data is encoded in a divided manner, to extract pulses of the plurality of messages included in the message group; and a data output unit configured to output the first data and the second data corresponding to the pulse information stored in the buffer for each pulse included in the plurality of messages.

2. The receiving apparatus according to claim 1, further comprising an adjusting unit configured to adjust the second pulse acceptable range based on a pulse period or pulse width indicated by the first pulse and a reference period or reference width of the synchronization pulse.

3. The receiving apparatus according to claim 2, wherein the adjusting unit is configured to adjust the second pulse acceptable range based on a ratio of the pulse period or pulse width indicated by the first pulse relative to the reference period or reference width of the synchronization pulse.

4. The receiving apparatus according to claim 1, further comprising:

an extracting unit configured to extract a predetermined number of pulses with reference to the first pulse as pulses included in a message; and a data output unit configured to output reception data corresponding to the pulse information stored in the buffer for each pulse included in the message.

5. The receiving apparatus according to claim 1, wherein:

the receiving unit is configured to generate an interrupt in response to detecting at least one of rise or fall of a received signal; and the pulse information storing unit is configured to store, in the buffer, pulse information indicating a pulse period or pulse width corresponding to an interval of generation of the interrupt.

6. The receiving apparatus according to claim 1, wherein the extracting unit is configured to detect the starting message of the message group in response to a number of messages stored in the buffer, the number being greater than a number of messages to be included in the message group.

7. The receiving apparatus according to claim 6, wherein the extracting unit is configured to detect the starting message of the message group in response to a number of messages stored in the buffer, the number being greater than or equal to a predetermined number greater than or equal to twice the number of messages to be included in the message group minus one.

8. A receiving method comprising:

receiving a plurality of pulses including a synchronization pulse having a predetermined synchronization pulse width, a first data pulse having a data pulse width corresponding to a value of first data, and a second data pulse having a data pulse width corresponding to a value of partial data in which second data is encoded in a divided manner;

storing, in a buffer, pulse information indicating a pulse period or pulse width of each of the plurality of pulses included in a message;

searching for a first pulse indicating a pulse period or pulse width that falls within a synchronization pulse acceptable range from among a plurality of pieces of pulse information stored in the buffer for the plurality of pulses;

detecting a second pulse at a predetermined location relative to the first pulse, where a pulse period or pulse width of the second pulse falls within a data pulse acceptable range; and identifying the first pulse as the synchronization pulse on condition that the pulse period or pulse width of the first pulse falls within the synchronization pulse acceptable range, the pulse period or pulse width of the second pulse falls within the data pulse acceptable range, and the second pulse is at the predetermined location with respect to the first pulse, extracting, based on the pulse information of each message stored in the buffer, a starting message of a message group including a plurality of messages in which the second data is encoded in a divided manner to extract pulses of the plurality of messages included in the message group; and outputting the first data and the second data corresponding to the pulse information stored in the buffer for each pulse included in the plurality of messages.

9. A non-transitory, computer-readable recording medium having recorded thereon a receiving program that, when executed by a computer, causes the computer to function as:

a receiving unit configured to receive a plurality of pulses including a synchronization pulse having a predetermined synchronization pulse width a first data pulse having a data pulse width corresponding to a first value of data, and a second data pulse having a data pulse width corresponding to a value of partial data in which second data is encoded in a divided manner;

a pulse storing unit configured to store, in a buffer, pulse information indicating a pulse period or pulse width of each of the plurality of pulses included in a message;

a searching unit configured to search for a first pulse indicating a pulse period or pulse width that falls within a synchronization pulse acceptable range from among a plurality of pieces of pulse information stored in the buffer for the plurality of pulses;

a detecting unit configured to detect a second pulse at a predetermined location relative to the first pulse, where a pulse period or pulse width of the second pulse falls within a data pulse acceptable range; and an identifying unit configured to identify the first pulse as the synchronization pulse on condition that the pulse period or pulse width of the first pulse falls within the synchronization pulse acceptable range, the pulse period or pulse width of the second pulse falls within the data pulse acceptable range, and the second pulse is at the predetermined location with respect to the first pulse, an extracting unit configured to detect, based on the pulse information of each message stored in the buffer, a starting message of a message group including a plurality of messages in which the second data is encoded in a divided manner, to extract pulses of the plurality of messages included in the message group; and a data output unit configured to output the first data and the second data corresponding to the pulse information stored in the buffer for each pulse included in the plurality of messages.

* * * * *